United States Patent
Rabska et al.

(10) Patent No.: US 9,579,939 B2
(45) Date of Patent: Feb. 28, 2017

(54) HEAVY DUTY ADJUSTABLE GOOSENECK COUPLER

(71) Applicant: Cequent Performance Products, Inc., Plymouth, MI (US)

(72) Inventors: Kevin Rabska, Junction City, WI (US); Frank Drake, Wausau, WI (US); Erik Alanko, Wausau, WI (US)

(73) Assignee: Cequent Performance Products, Inc., Junction City, WI (US)

( * ) Notice: Subject to any disclaimer, the term of this patent is extended or adjusted under 35 U.S.C. 154(b) by 0 days.

(21) Appl. No.: 14/616,052

(22) Filed: Feb. 6, 2015

(65) Prior Publication Data

US 2015/0217608 A1    Aug. 6, 2015

Related U.S. Application Data

(60) Provisional application No. 61/936,445, filed on Feb. 6, 2014.

(51) Int. Cl.
  *B60D 1/06* (2006.01)
  *B60D 1/46* (2006.01)
  *B60D 1/48* (2006.01)

(52) U.S. Cl.
  CPC .............. *B60D 1/065* (2013.01); *B60D 1/46* (2013.01); *B60D 1/488* (2013.01)

(58) Field of Classification Search
  CPC .......... B60D 1/015; B60D 1/06; B60D 1/065; B60D 1/46; B62D 53/061; B62D 53/065
  See application file for complete search history.

(56) References Cited

U.S. PATENT DOCUMENTS

| | | | | | |
|---|---|---|---|---|---|
| 4,283,073 | A | * | 8/1981 | Gostomski et al. | 280/508 |
| 4,699,395 | A | * | 10/1987 | Hale | 280/511 |
| 5,354,087 | A | * | 10/1994 | Head | 280/490.1 |
| 5,382,109 | A | * | 1/1995 | Nyman | 403/316 |
| 6,234,509 | B1 | * | 5/2001 | Lara | 280/425.2 |
| 6,776,431 | B1 | * | 8/2004 | Dick | 280/425.2 |
| 7,097,193 | B1 | * | 8/2006 | Sievert | 280/441.2 |
| 2003/0001362 | A1 | * | 1/2003 | Ebey | 280/441.2 |
| 2003/0047908 | A1 | * | 3/2003 | Lara | 280/441.2 |
| 2003/0173757 | A1 | * | 9/2003 | Smith | 280/417.1 |
| 2005/0253361 | A1 | * | 11/2005 | Bouwkamp | 280/441.2 |
| 2013/0277944 | A1 | * | 10/2013 | Drake et al. | 280/490.1 |

* cited by examiner

*Primary Examiner* — Tony Winner
(74) *Attorney, Agent, or Firm* — McDonald Hopkins LLC

(57) ABSTRACT

A gooseneck coupler is shown and described. The gooseneck coupler may include a first member having at least one aperture, a second member having at least one aperture, the second member telescopingly engaged with the first member where the aperture of the first member is generally aligned with the aperture of the second member, and a base member attached with the second member, the base member having a socket shaped to accept a hitch ball. The gooseneck coupler may also include a locking member pivotally attached with the base member, and a fastening device securing the first and second members. The fasting device may include at least one nut attached with at least one elongated member, where the nut and elongated member are positioned within the second member, and a fastener inserted into the apertures of the first and second members and selectively engaged with the nut.

23 Claims, 15 Drawing Sheets

HEAVY DUTY ADJUSTABLE GOOSENECK COUPLER

CROSS-REFERENCE TO RELATED APPLICATION

This application claims benefit from U.S. Provisional Patent Application No. 61/936,445, entitled "Heavy Duty Adjustable Gooseneck Coupler," filed on Feb. 6, 2014, which is hereby incorporated in its entirety by reference.

FIELD OF THE INVENTION

The present invention is generally related to a coupler for securing a towed vehicle to a towing vehicle and, more particularly, to a heavy duty adjustable gooseneck coupler.

BACKGROUND

Many vehicles are designed to transport freight, goods, merchandise, personal property, and other large cargo. Often, these vehicles may be arranged to tow a towed vehicle, such as for example a trailer, by attaching the towed vehicle to the towing vehicle through use of some kind of hitch assembly. The towing industry has developed a number of methods and apparatuses for securing or engaging the towed vehicle to the towing vehicle, such as attaching a trailer to a pick-up truck or other kind of truck with a load bed.

There are many different types of trailer hitches in the art that may be attached to the towing vehicle depending on the type of towed vehicle and towing vehicle involved. Some of the most common types of hitches include gooseneck, fifth wheel, and rear mounted. For example, towed vehicles may be connected to the towing vehicle by way of a hitch assembly that includes a ball hitch or member secured to the towing vehicle and a ball socket coupling mechanism secured to the towed vehicle that mounts over the hitch ball and thereby allows for the towed vehicle to pivot behind the towing vehicle.

Numerous types of hitch balls have been developed to be attached to the bumper or other rear portion of a towing vehicle. The towed vehicle may be equipped with a coupler mechanism to be attached to the towing vehicle by placing the coupler mechanism over the hitch ball and securing the coupler to the hitch ball. Similar apparatus using hitch receivers attached to the rear of the towing vehicle and drawbars may be used to secure towed vehicles to towing vehicles.

Some towed vehicles may be designed to carry heavy loads. Connecting such a towed vehicle to a ball hitch on a bumper of a towing vehicle, however, may be impractical. When a towed vehicle load is heavy as compared to the weight of the towing vehicle, applying the towed vehicle load generally over or in front of the rear axle of the towing vehicle may create a more desirable towing condition. In addition, such an arrangement may put much of the force of the towed vehicle load onto structural members of the towing vehicle, such as the frame, whereby the hitch ball may be located, for example, in the truck bed.

There are generally two arrangements for securing a towed vehicle to the bed of a towing vehicle—a fifth wheel hitch and a gooseneck hitch. A fifth wheel hitch may be utilized with towed vehicles having a king pin, which may be part of a pin box attached to the towed vehicle. A gooseneck hitch may be utilized with a towed vehicle having a gooseneck coupler that may generally be coupled to a hitch ball that may be located in the bed of the towing vehicle. The hitch ball may be permanently or removably secured to the frame or bed of the towing vehicle.

The towed vehicle coupler often has a socket portion that is sized and shaped to receive the hitch ball. The gooseneck coupler may engage the hitch ball to pivotally couple the towed vehicle to the towing vehicle. The gooseneck coupler to hitch ball connection may allow for relative movement between the towing vehicle and the towed vehicle as the towing vehicle makes turns, traverses uneven or rough terrain, and passes along inclining and declining roadways. The hitch ball member may be removed or lowered to a stowed position below the bed to ensure that the use of the bed is not substantially hindered by the presence of the ball.

Gooseneck couplers may be utilized for heavy duty towing, but have limitations under such conditions. For example, a gooseneck coupler utilized in conjunction with a heavy duty ball, such as a three inch ball, may offer a head rating of 40,000 pounds or adjustable applications of up to 30,000 pounds. However, adjustable applications are not available with a rating of over 30,000 pounds. The current three inch ball heads having ratings up to 40,000 pounds maximum gross trailer weight do not provide adjustment or telescoping tubes. These gooseneck couplers have design constraints that contribute their failure to meet the SAE minimum pitch and roll and vertical tension requirements.

Further, there is limited ball articulation and no landing area for ball entry, which makes hook up difficult. There are other three inch ball heads with a 30,000 pound load capacity with adjustable couplers. These gooseneck couplers, however, are only rated at 30,000 pound maximum gross trailer weight rating. These also include a lot of moving parts, pinch points and are difficult to operate. Further, these prior art gooseneck couplers do not posses a landing area large enough to allow the hitch ball and socket to be off center by more than one inch and still find center without having to reposition the tow vehicle in relation to the towing vehicle. Instead they utilize a front only ball entry.

Therefore, there is a need for a heavy duty adjustable gooseneck coupler having a rating of over 30,000 pounds that overcomes the deficiency noted above.

SUMMARY

A gooseneck coupler is shown and described. The gooseneck coupler may include a first member having at least one aperture, a second member having at least one aperture, the second member telescopingly engaged with the first member where the aperture of the first member is generally aligned with the aperture of the second member, and a base member attached with the second member, the base plate having a socket shaped to accept a hitch ball. The gooseneck coupler may also include a locking member pivotally attached with the base member, and a fastening device securing the first and second members. The fasting device may include at least one nut attached with at least one elongated member, where the nut and elongated member are positioned within the second member, and a fastener inserted into the apertures of the first and second members and selectively engaged with the nut.

A gooseneck coupler may include a first tube, a second tube telescopingly engaged with the first tube, and a base member attached with the second tube, the base plate having a socket shaped to accept a hitch ball and a first engaging member. The gooseneck coupler may also include a locking member pivotally attached with the base member, the locking member having a second engaging member where engagement of the first and second engaging members generally maintains the base member and locking member in an operative position with respect to one another under a load.

A gooseneck coupler capable of operatively engaging a hitch ball having a generally spherical portion, the hitch ball positioned in a load bed of a towing vehicle, may include an outer tube, an inner tube telescopingly engaged with the outer tube, and a base member attached with the inner tube, the base plate having a socket shaped to accept the hitch ball. The gooseneck coupler may also include a locking member pivotally attached with the base member, where the locking member is configured to engage the spherical portion of the hitch ball, whereby the hitch ball articulates with the base member at an angle between 15 and 24 degrees.

BRIEF DESCRIPTION OF THE DRAWINGS

The invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
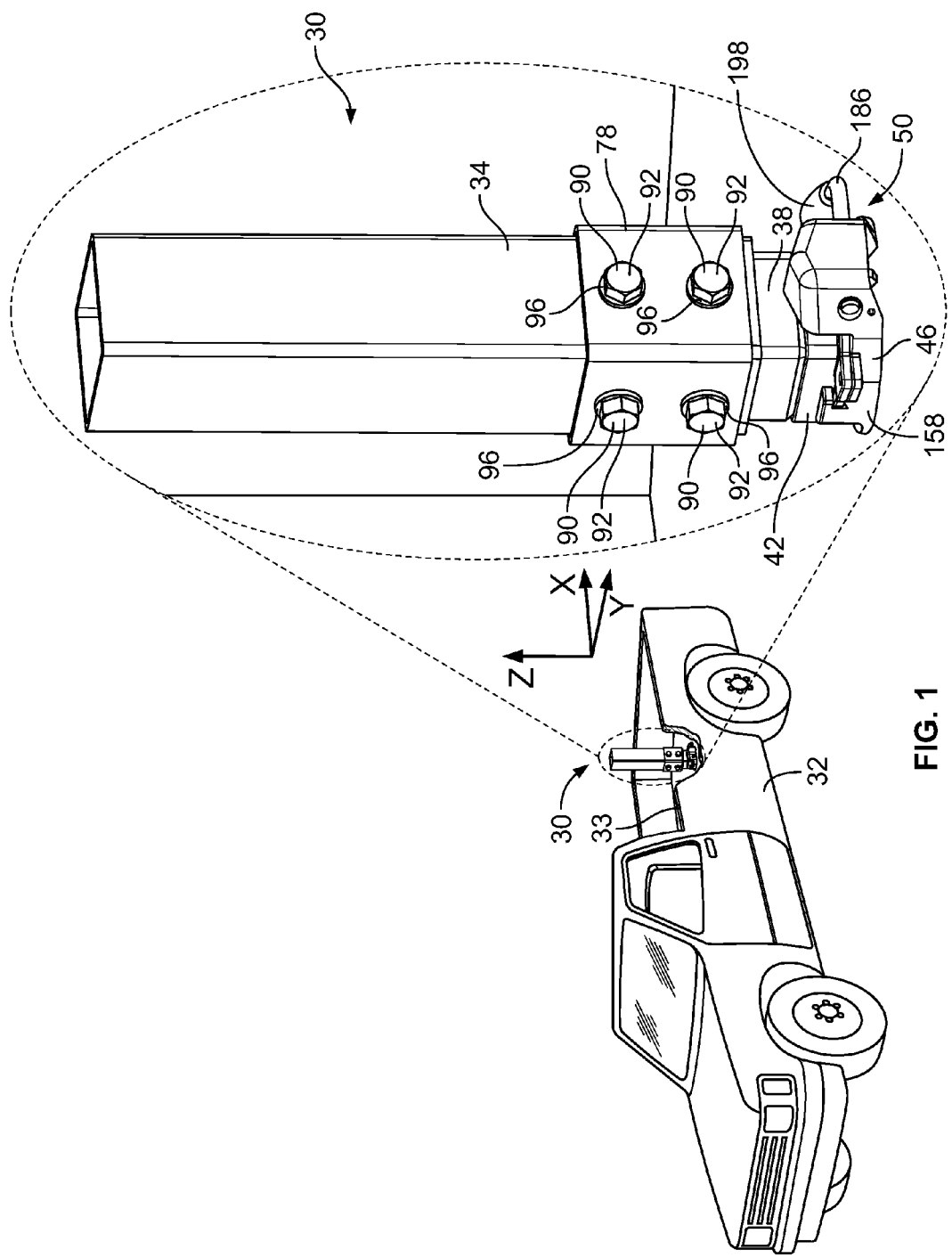
FIG. 1 is a perspective view of embodiments of a gooseneck coupler in a non-limiting example attached to a towing vehicle in a first position.
Figure 2:
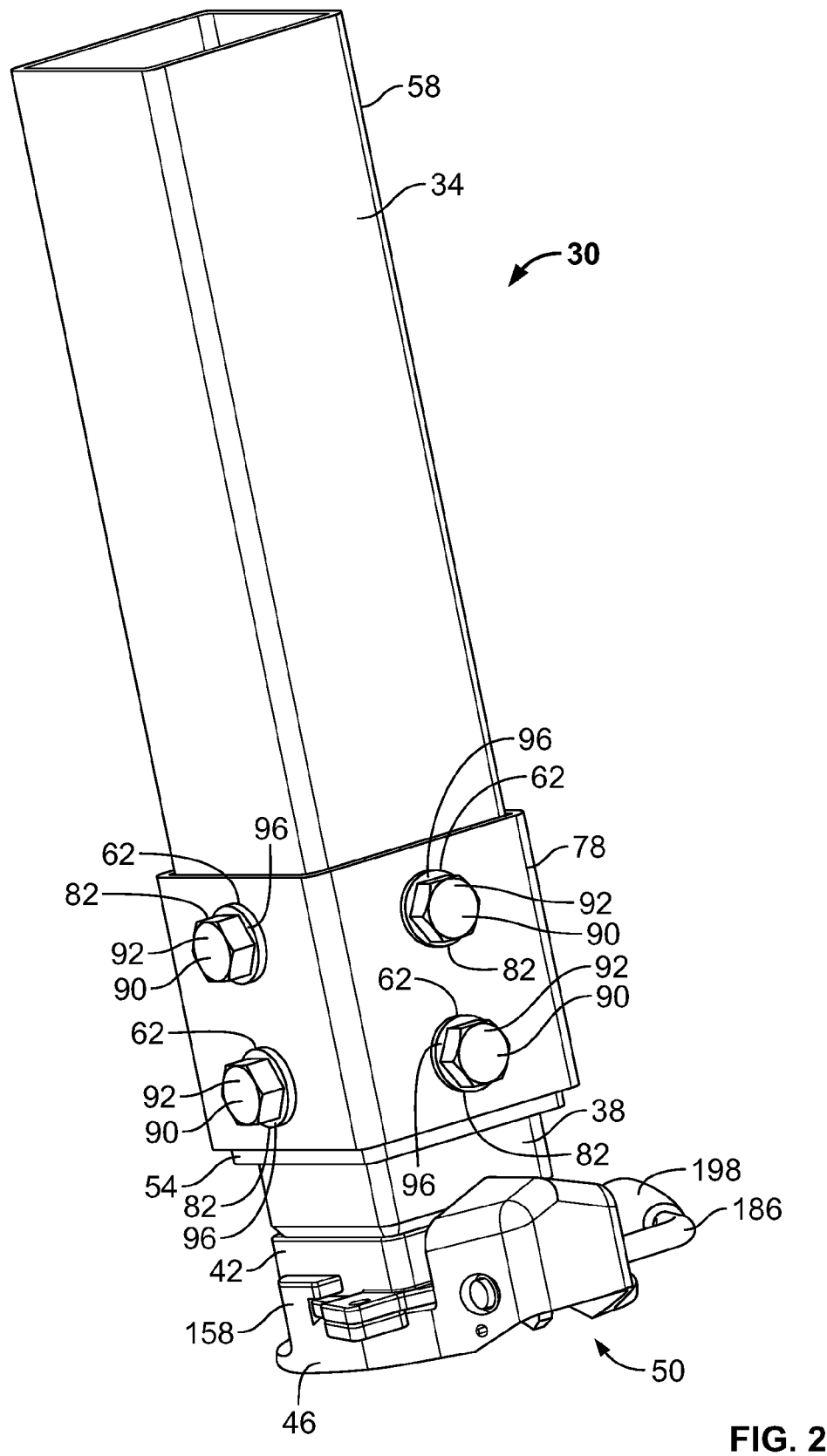
FIG. 2 is a perspective view of the gooseneck coupler in the first position.

A gooseneck coupler 30 is illustrated in FIGS. 1-2. The gooseneck coupler 30 may be configured to be secured to a towed vehicle, such as a trailer (not shown) and to engage a towing vehicle 32, such as a truck, as shown in FIG. 1. As shown, the gooseneck coupler 30 may be operatively coupled in a load bed 33 of the towing vehicle 32 as describe in more detail below. The gooseneck coupler 30 may be of any appropriate shape, size, type or configuration. The gooseneck coupler 30 may include an outer tube 34, an inner tube 38, a base plate 42, a locking plate 46, and a locking mechanism 50 of any appropriate configuration.

The outer tube 34 may be of any appropriate shape, size, type or configuration, such as of a generally cylindrical or rectangular tubular configuration. In an exemplary embodiment, the outer tube 34 is shown as a generally square tubular configuration. The outer tube 34 being a generally rectangular configuration may allow the gooseneck coupler 30 to handle larger loads as the outer tube 34 may possess more material than other prior art versions at locations where more forces are applied. In such embodiments, the outer tube 34 may have greater section strength in various axes than prior art symmetric sections, i.e., more material may be added where needed to provide the greater section strength. By way of a non-limiting example, the outer tube 34 may have a shape, such as rectangular, that permits more material to be provided in applicable locations along the outer tube 34, which may provide additional support for the outer tube 34. The shape of the outer tube 34 may permit more material to be positioned in a location where additional forces are applied during operation of the gooseneck coupler 30.

The outer tube 34 may be located at any appropriate position on the gooseneck coupler 30, such as outside of and generally circumscribing the inner tube 38. For example, the outer tube 34 may be of a slightly larger interior dimension than an exterior dimension of the inner tube 38.

Figure 3:
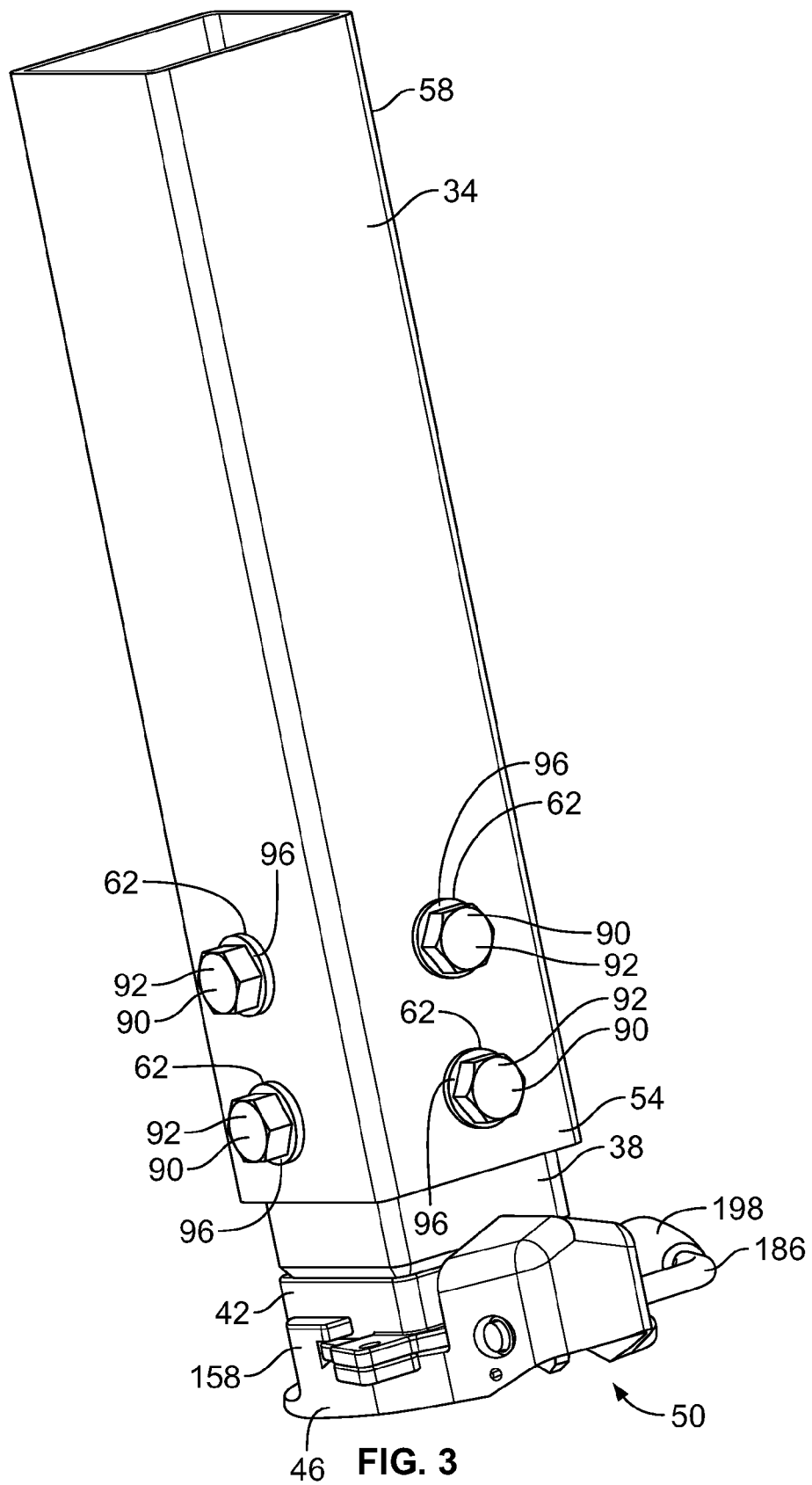
FIG. 3 is a perspective view of a portion of the gooseneck coupler without reinforcing ring members.

The outer tube 34 may include a first end 54 and a second end 58. The second end 58 of the outer tube 34 may attach to the towed vehicle in a variety of variations, e.g., welded, fastened or the like—the present teachings are not limited to any variation of attachment. The first end 54 may be in proximity to the base plate 42 when the outer tube 34 operatively engages the inner tube 38. The outer tube 34 may include at least one aperture 62. As shown in FIG. 3, the outer tube 34 may include a pair of apertures 62 on adjacent sides of the outer tube 34. While two pairs of apertures 62 are shown, the present teachings are not limited to such. Any appropriate number of apertures 62 may be utilized. For example, the outer tube 34 may include three pairs of apertures, four pair of apertures, etc. Further still, while the apertures 62 are shown as being on adjacent sides of the outer tube 34, the apertures 62 may be on any side of the outer tube 34, e.g., on opposed sides thereof.

The inner tube 38 may be of any appropriate shape, size, type or configuration, such as of a generally cylindrical or rectangular tubular configuration. For example, the inner tube 38 may be of a correspondingly similar shape as that of the outer tube 34 such that the inner tube 38 telescopingly engages the outer tube 34. In an exemplary embodiment, the inner tube 38 is shown as a generally square tubular configuration. The inner tube 38 being a generally rectangular configuration may allow the gooseneck coupler 30 to handle larger loads as the inner tube 38 may possess more material than other prior art versions at locations where more forces are applied. In such embodiments, the inner tube 38 may have greater section strength in various axes than prior art symmetric sections, i.e., more material may be added where needed to provide the greater section strength. By way of a non-limiting example, the inner tube 38 may have a shape, such as rectangular, that permits more material to be provided in applicable locations along the inner tube 38, which may provide additional support for the inner tube 38. The shape of the inner tube 38 may permit more material to be positioned in a location where additional forces are applied during operation of the gooseneck coupler 30. Further, as the outer and inner tubes 34, 38 having a corresponding shape, the benefits identified above may be compounded to further enhance the strength and capabilities of the gooseneck coupler 30.

The inner tube 38 may be of a slightly smaller exterior dimension than an interior dimension of the outer tube 34. The inner tube 38 may be located at any appropriate position on the gooseneck coupler 30, such as located within a portion of or entirely within the outer tube 34. When operatively engaged, the inner tube 38 may be positionable from a retracted position to an extended position.

Figure 4:
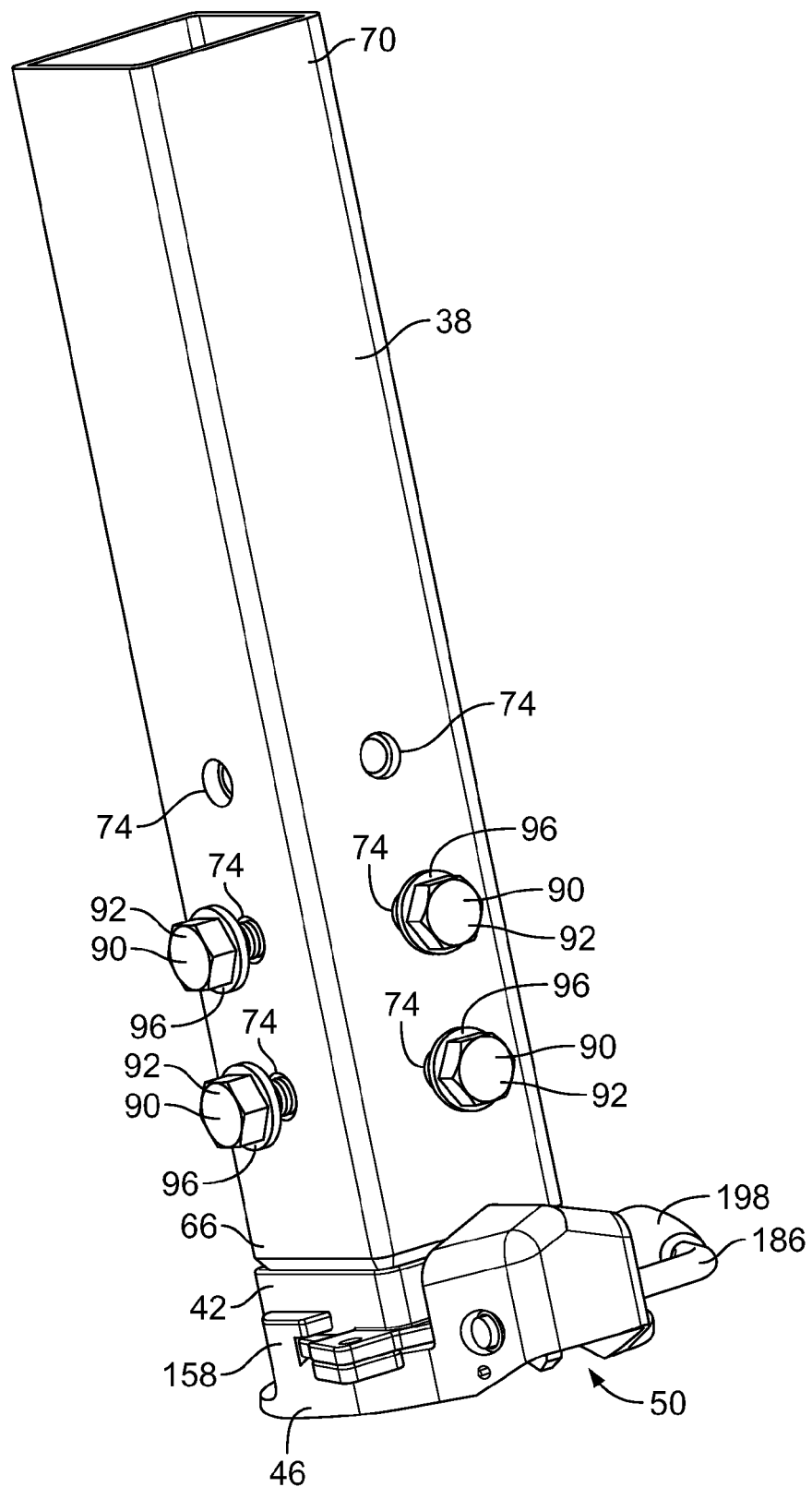
FIG. 4 is a perspective view of a portion of the gooseneck coupler with an inner tube shown.

As further shown in the drawings, the inner tube 38 may include first and second ends 66, 70, respectively. The inner tube 38 may be attached to the base plate 42 at the first end 66 such as by welding, attaching using fasteners, monolithically forming the inner tube 38 and the base plate 42 such as by forging or casting, or any other attachment process. The second end 70 of the inner tube 38 may extend into the outer tube 34. The inner tube 38 may further include at least one aperture 74, such as a pair of apertures 74 on adjacent sides of the inner tube 38. By way of a non-limiting example and as shown in FIG. 4, the inner tube 38 may include three pairs of aligned apertures 74 on adjacent sides of the inner tube 38. It should be understood, however, that the inner tube 38 may include any appropriate number of apertures 74. Further still, while the apertures 74 are shown as being on adjacent sides of the inner tube 38, the apertures 74 may be on any side of the inner tube 38, e.g., on opposed sides thereof. At least a portion of the apertures 62 and 74 may be generally aligned when the outer and inner tubes 34, 38 are operatively engaged.

The outer and inner tubes 34, 38 may be configured as anti-rattle telescoping tube members when operatively engaged with one another. In such embodiments, the gooseneck coupler 30 may include at least one reinforcing ring member 78 that may generally circumscribe the outer tube 34 and be operatively engaged therewith—see FIG. 2. The reinforcing ring member 78 may include a corresponding cross-sectional shape to that of the outer tube 34, e.g., it may have a generally rectangular shape. While the reinforcing ring member 78 is shown circumscribing the entirety of the entire circumference of the outer tube 34, the present teachings are not limited to such. For example, the reinforcing ring member 78 may circumscribe only a portion of the outer tube 34. The reinforcing ring 78 may provide reinforcement to the first end 54 of the outer tube 34, which may allow the gooseneck coupler 30 to handle additional loads.

The reinforcing ring member 78 may include two pairs of apertures 82 on adjacent sides of the reinforcing ring member 78. The apertures 82 of the reinforcing ring member 78 may be generally aligned with the apertures 62 of the outer tube 34 when the reinforcing ring member 78 is operatively engaged with the outer tube 34. While each reinforcing ring member 78 is shown as having two pairs of apertures 82, the present teachings are not limited to this configuration—any appropriate number of apertures 82 may be utilized. The apertures 82 may be formed in the reinforcing ring members 78 in advance of assembling such to the outer tube 34 or the apertures 82 may be formed as the reinforcing ring member or members 78 are being attached with the outer tube 34. In such embodiments, the apertures 82 may be drilled into the reinforcing ring members 78.

Further, the present teachings are not limited to a single reinforcing ring member 78; any appropriate number of reinforcing ring members 78 may be utilized—the gooseneck coupler 30 may include as many reinforcing ring members 78 as the outer tube 34 has pairs of apertures 62. By way of a non-limiting example, the gooseneck coupler 30 may include a pair of reinforcing ring members 78. Each of the pair of reinforcing ring members 78 may include the apertures 82 on adjacent sides thereof that may generally align with the apertures 62 of the outer tube 34. Further still, the gooseneck coupler 30 may not include a reinforcing ring member 78—see FIG. 3.

Figure 5:
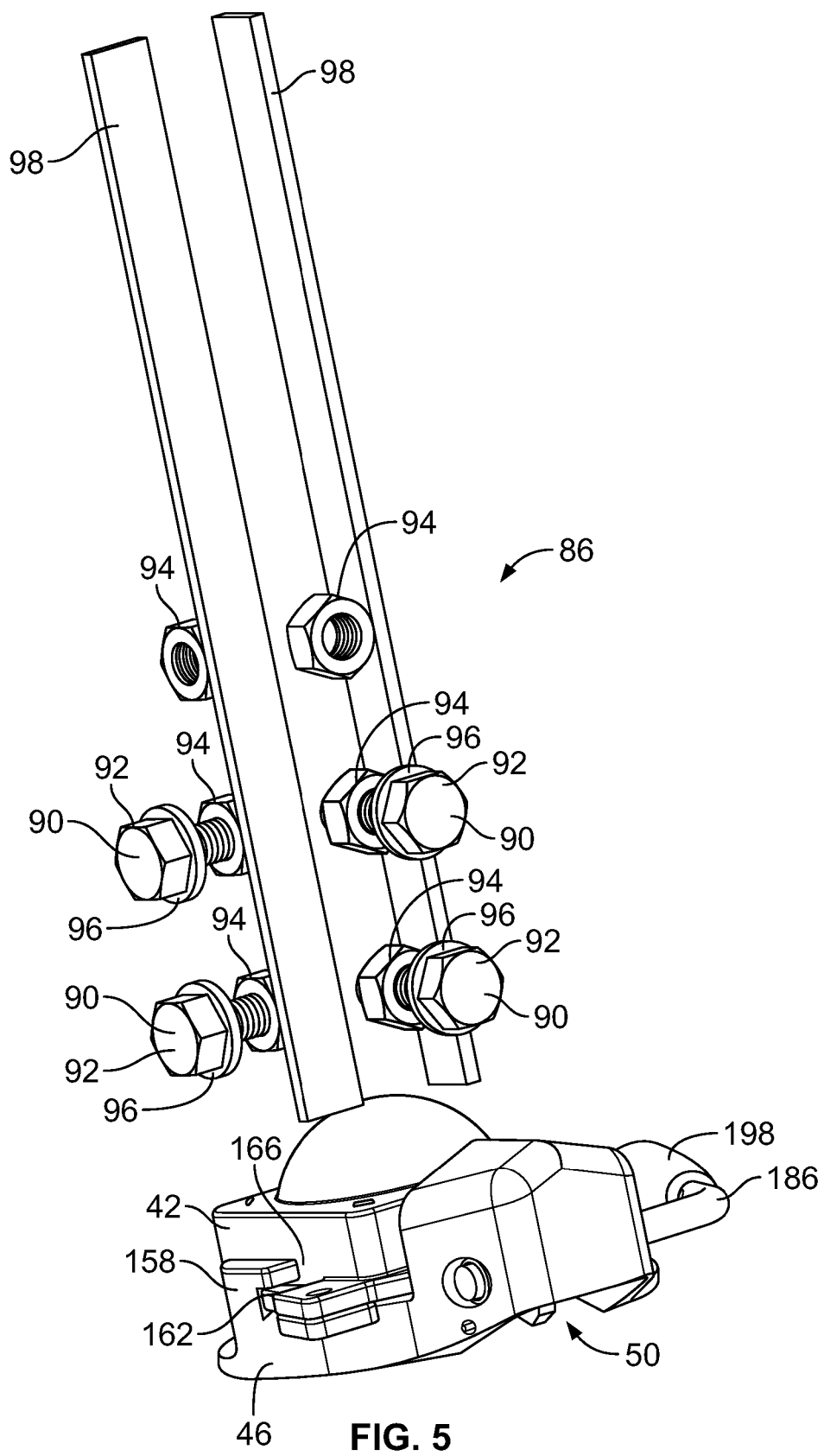
FIG. 5 is a perspective view of a portion of the gooseneck coupler of with a fastening device shown.
Figure 6:
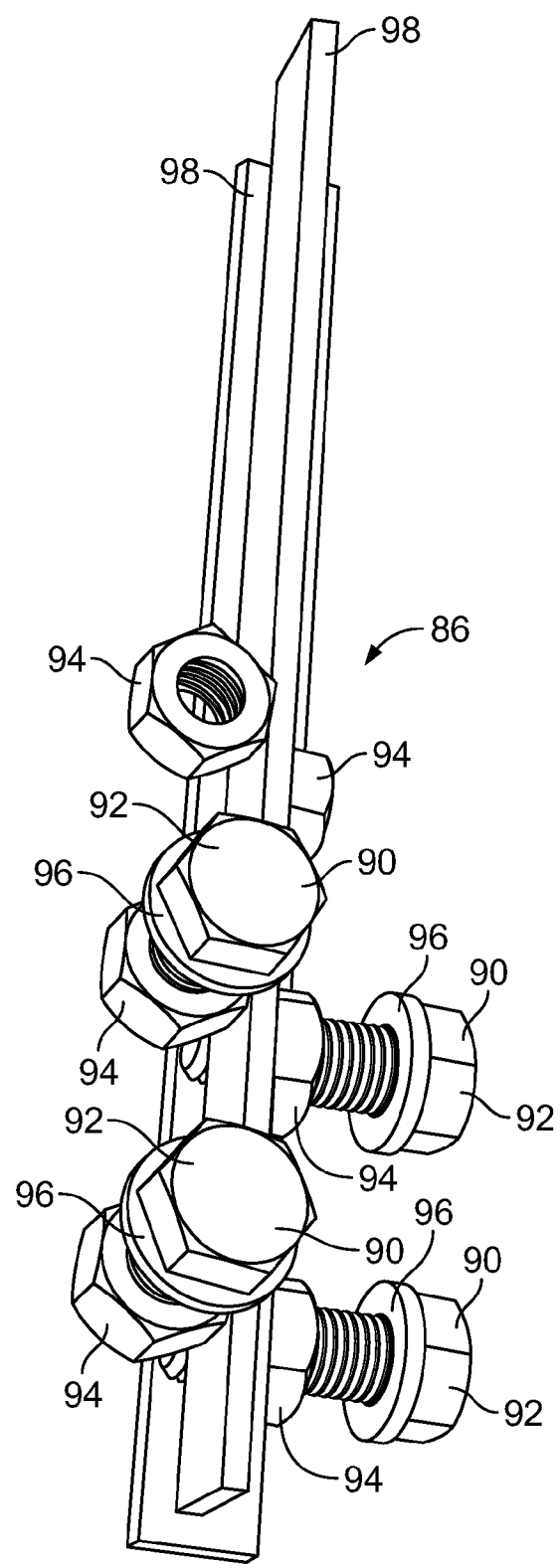
FIG. 6 is a perspective view of the fastening device of FIG. 5.
Figure 7:
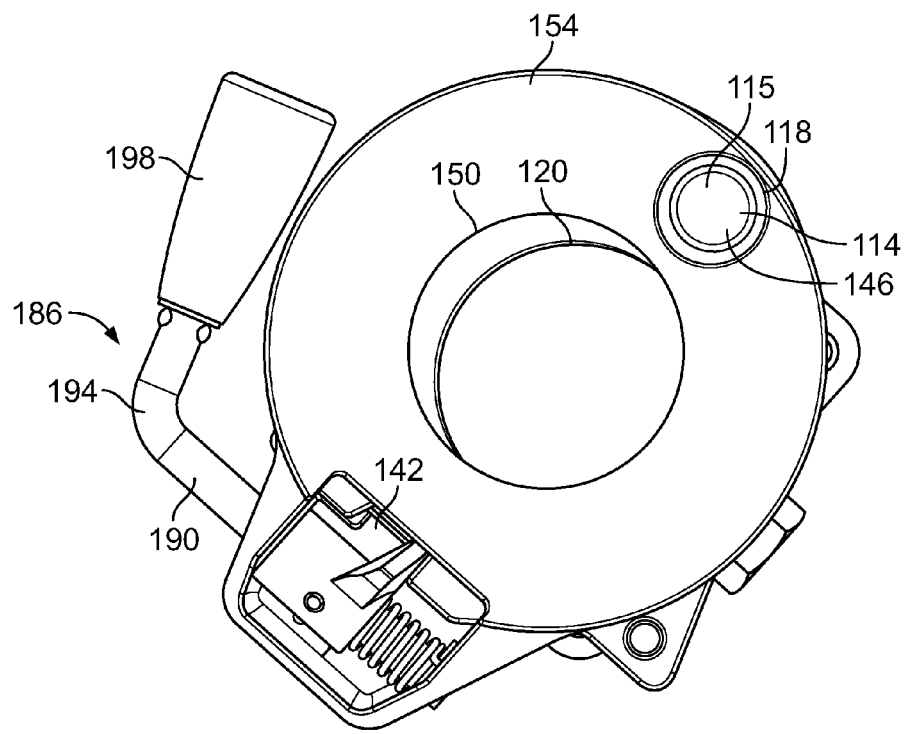
FIG. 7 is a bottom view of the gooseneck coupler.
Figure 8:
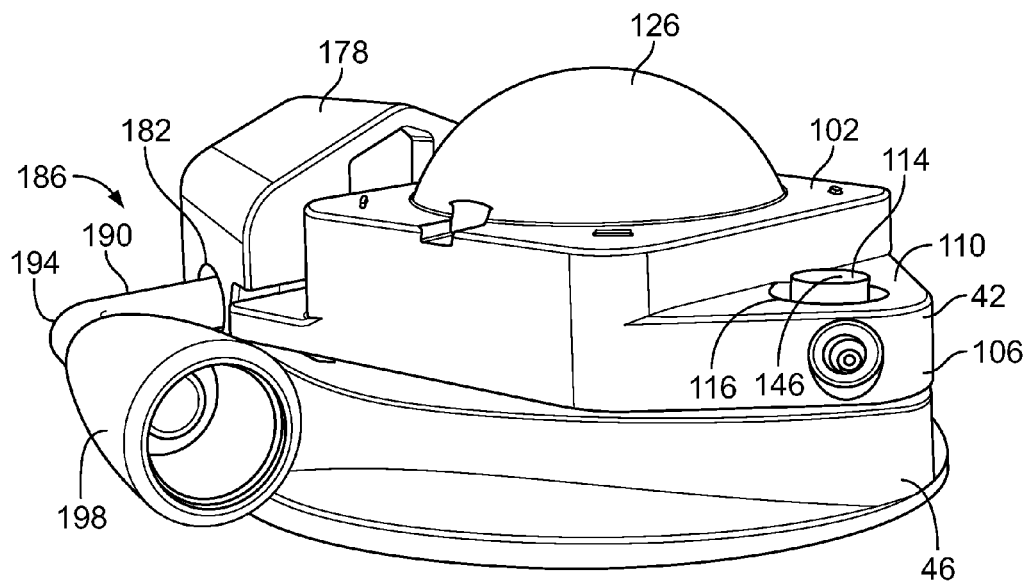
FIG. 8 is side view of a portion of the gooseneck coupler of FIG. 1.
Figure 9:
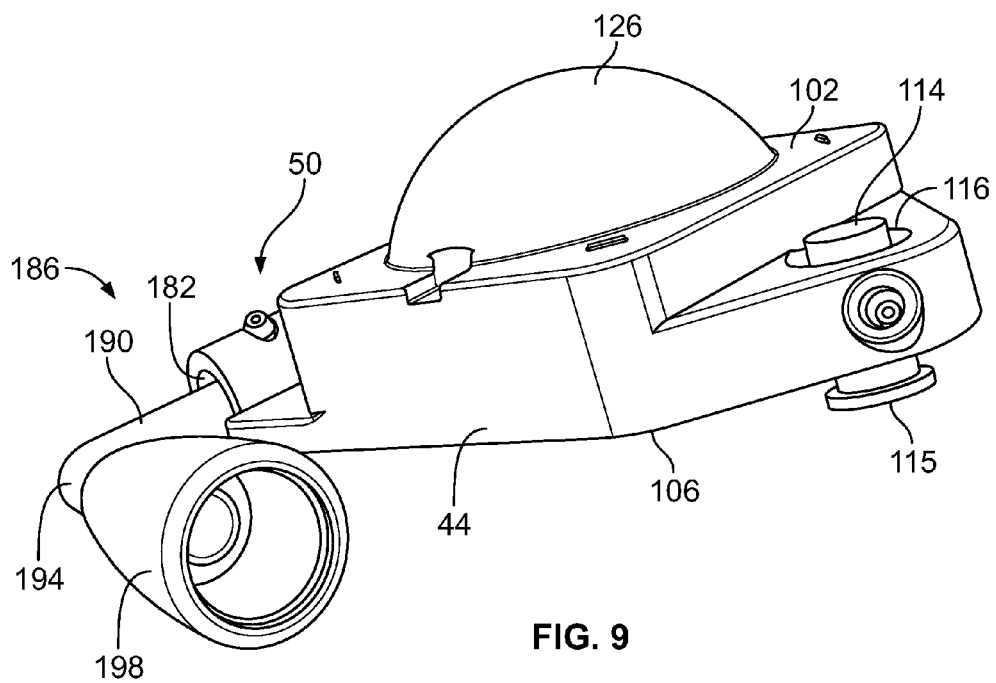
FIG. 9 is a side perspective view of a portion of the gooseneck coupler of FIG. 1.
Figure 10:
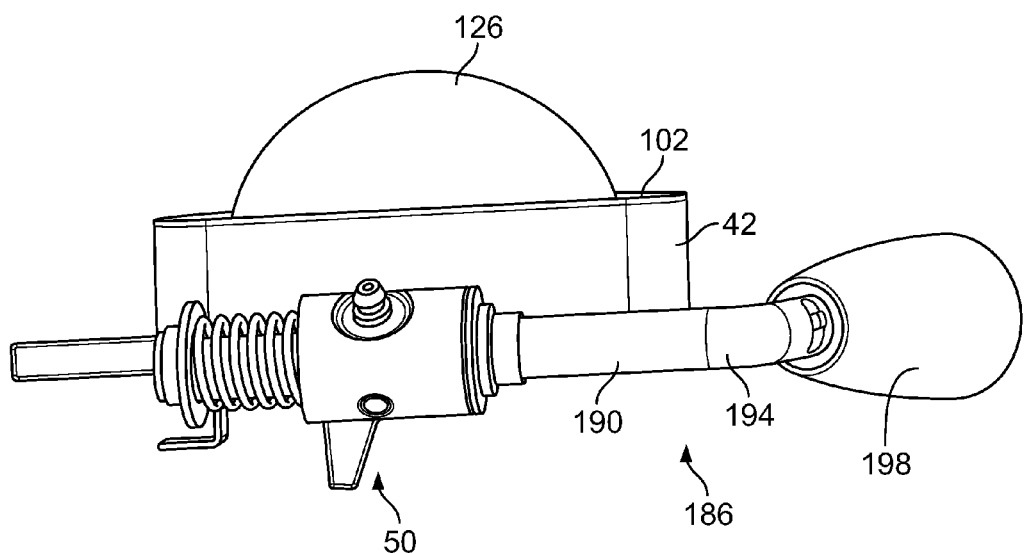
FIG. 10 is a side view of a portion of the gooseneck coupler with a locking mechanism shown.
Figure 11:
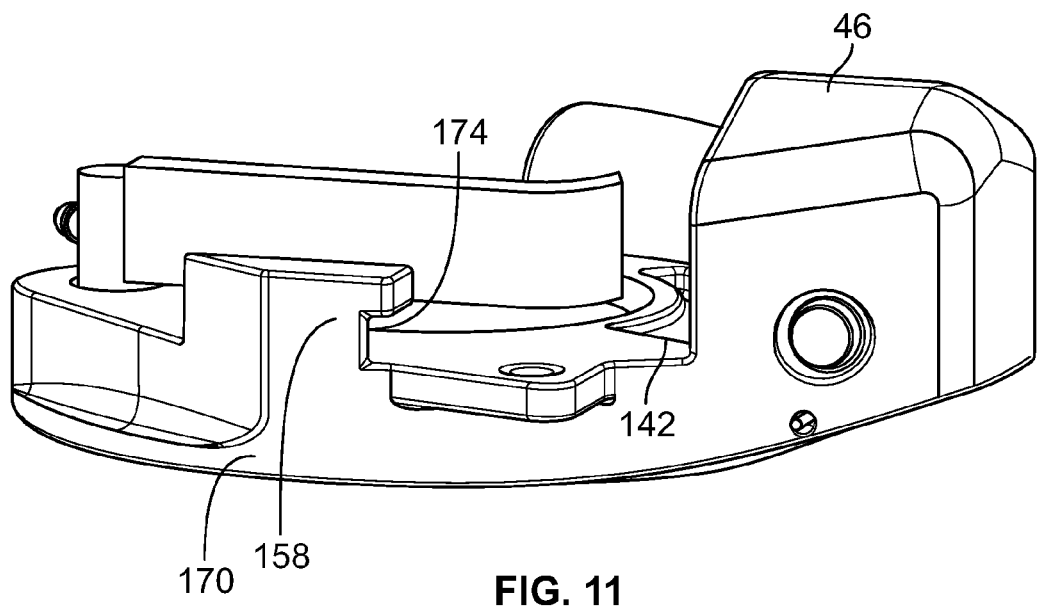
FIG. 11 is a side view of the base plate of the gooseneck coupler.
Figure 12:
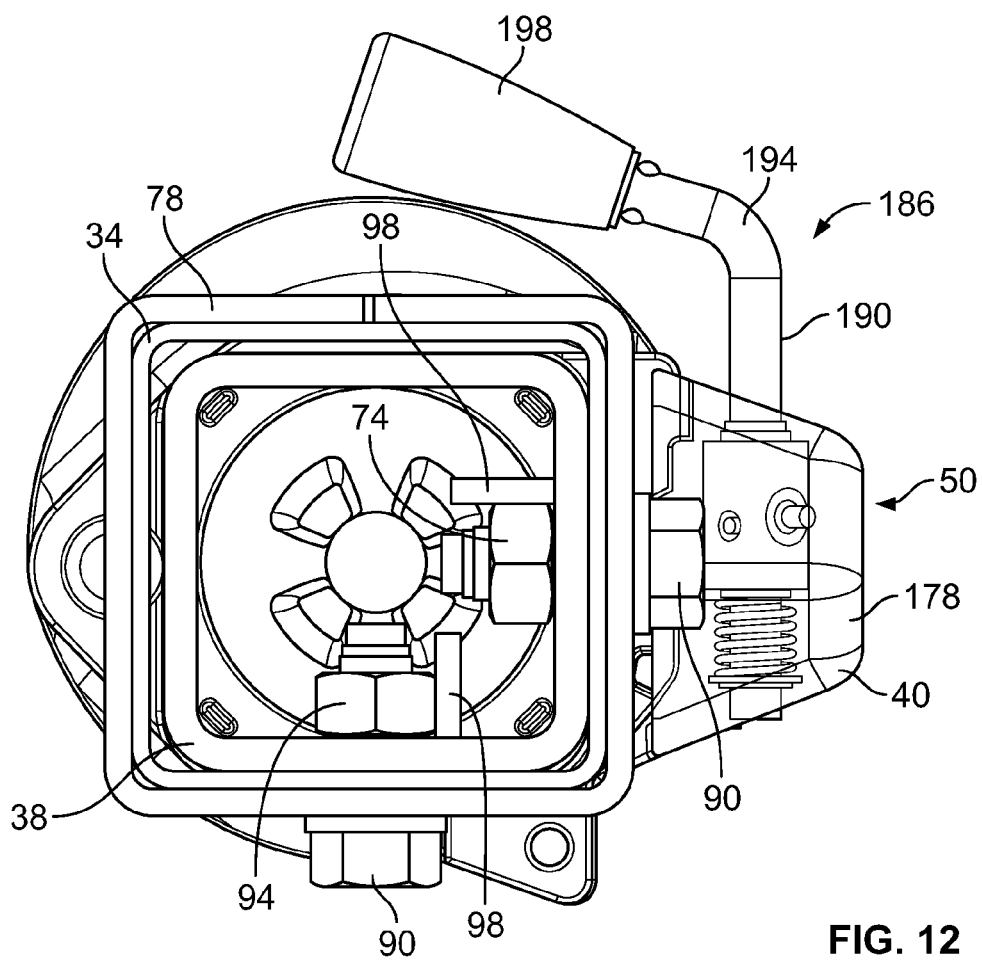
FIG. 12 is a top view of the gooseneck coupler.
Figure 13:
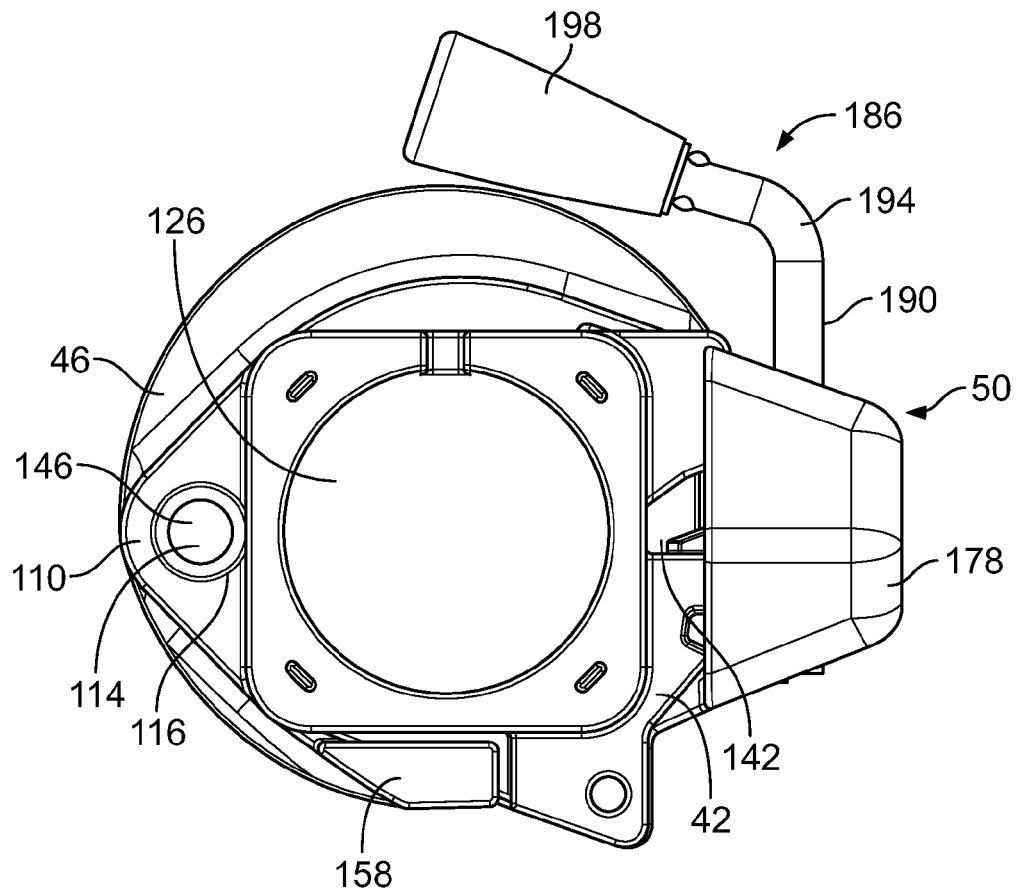
FIG. 13 is a top view of a portion of the gooseneck coupler.

The gooseneck coupler 30 may include at least one fastening device 86 that selectively secures the outer and inner tubes 34, 38 together in a plurality of operative positions, such as for example in two, three or four positions. The fastening device 86 may include a plurality of fasteners 90 and a corresponding number of nuts 94 that are selectively engageable with the fasteners 90. In some embodiments, hardened washers 96 may be engaged with the fasteners 90 between the fasteners—or more specifically the head 92 of the fasteners 90—and the reinforcing ring member 78. The washers 96 may distribute load of the fasteners 90 and further ensure that the heads 92 of the fasteners 90 do not enter the aperture 62 of the outer tube 34. Further, the washers 96 may provide a generally smooth surface for which the fasteners 90 bear. The fastening device 86, however, may include at least one more pair of nuts 94 than fasteners 90—see FIGS. 4 and 5. Having the additional set of nuts 94 may assist with the adjustability of the gooseneck coupler 30 as detailed below. By way of a non-limiting device, the fastening device 86 may include two pairs of fasteners 90 having a configuration whereby they are selectively insertable into the apertures 62, 74, 82 of the outer and inner tubes 34, 38 and the reinforcing ring members 78, respectively from outside of the outer tube 34. More specifically, the fasteners 90 may be insertable through apertures 62, 74, 82 from outside of the outer and inner tubes 34, 38. The fasteners 90 may include a head 92. The head 92 may be of any appropriate configuration, e.g., the head 92 may contain a hex head that is selectively engageable with a correspondingly shaped wrench. The heads 92 may be of a size and shape whereby they are prevented from passing through or otherwise being inserted into the apertures 62, 74 and 82.

In order to insert the fasteners 90 from outside of the outer tube 34, the nuts 94 may be positioned within the inner tube 38 to operatively align the nuts 94 to engage with the fasteners 90. The nuts 94, therefore, may need to be aligned with the apertures 62, 74, 82 of the outer and inner tubes 34, 38 and the reinforcing ring members 78, respectively. The fastening device 86 may include an elongated bar member 98 having the nuts 94 attached thereto. By way of a non-limiting example, the fastening device 86 may include a pair of elongated bar members 98. However, the present teachings are not limited to this configuration. Any appropriate number of elongated bar members 98 may be utilized, e.g., three, four, etc.

The elongated bar members 98 may each have attached thereto an appropriate number of nuts 94, e.g., a pair of nuts 94 may be attached, three nuts 94 may be attached, etc. The fastening device 86 may include at least one more pair of nuts 94 than fasteners 90. The nuts 94 may be attached with the elongated bar member 98 in any appropriate manner, including, without limitation, via welding, adhering, fastening or the like. Further, the nuts 94 may be monolithically formed with the elongated bar members 98.

The elongated bar members 98 may be formed of any appropriate material, including, without limitation metal, plastic, rubber or the like. The elongated bar member 98 may be of a length such that the user may insert the elongated bar member 98 and nuts 94 into the inner tube 38 through the second end 70 thereof. The elongated bar member 98 may be configured to permit the user to align the nuts 94 with the apertures 62, 74, 82 of the outer and inner tubes 34, 38 and the reinforcing ring members 78, respectively. The elongated bar 98 may be attached to or float with respect to the inner tube 38. In some embodiments, the elongated bar 98 may be attached, such as through welding, to the inner tube 38. This may be accomplished during manufacturing of the gooseneck coupler 30 or by the user thereafter. In such embodiments, ends of the elongated bar members 98 may be welded to the inner tube 38. The elongated bar members 98 may be inserted into the inner tube 38 and welded to the inner tube 38 at its ends, which are the portions that may be readily accessible to the user. In some embodiments, the elongated bar 98 may freely float with respect to the inner tube 38. In these embodiments, the user may insert the elongated bar 98 through the second end 70 of the inner tube 38. The user may attach the elongated bar 98 to the inner tube 38 or may hold it in its operative position and engage the fasteners 90 with the nuts 94.

It should be understood that the nuts 94 may be positioned within the inner tube 38 in any appropriate manner and the present teachings are not limited to the embodiments described and shown herein. Any type of floating nut may be utilized without departing from the present teachings. By way of a non-limiting example, cage nuts may be positioned within the inner tube 38 and the fastener 90 may be engaged as described above. Further, a trapped nut may be utilized. In these embodiments, the nut may only be partially attached (such as through welding) or may not be attached at all but may float within the inner tube 38. Any appropriate embodiment may be utilized. For example, the inner tube 38 may be cast such with a member that traps the nut within the inner tube 38 in an operative position. Further still, an opening may be formed on an exterior of the inner tube 38 to provide access to the inner tube 38 to weld the nut to the inner tube 38 in an operative position.

In order to operatively engage the outer and inner tubes 34, 38 with one another, the user may operatively align the outer and inner tube 34, 38, including aligning the applicable apertures 62, 74 thereof. The user may circumscribe the outer tube 34 with the reinforcing ring members 78 aligning the apertures 82 with the apertures 62, 74 of the outer and inner tubes 34, 38. However, in those embodiments that do not utilize the reinforcing ring member 78, the user need only align apertures 62, 74 of the outer and inner tubes 34, 38. The user may insert the elongated bar member 98 into the inner tube 38 aligning the nuts 94 with the apertures 62 of the inner tube 38. The user may attach the elongated bar member 98 with the inner tube 38 in advance of engagement with outer and inner tubes 34, 38 such as by welding or the elongated bar member 98 may come pre-attached with the inner tube 38 in its operative position, i.e., where the nuts 94 are aligned with the apertures 74. The fasteners 90 may be inserted into and through the apertures 62, 74, 82 and may selectively engage the aligned nuts 90. Utilizing the heads 92 of the fasteners 90, the fasteners 90 may be tightened to the applicable nuts 94. This may operatively engage the outer tube 34 with the inner tube 38.

Having the nuts 94 inside the inner tube 38 and fastening them with the fasteners 90 from the outside the outer tube 34 may pull the inner tube 38 into the inside corner of the outer tube 34. This may generally prevent rattling between the outer and inner tubes 34, 38 that may occur in prior art versions, especially other prior art heavy duty gooseneck couplers. The outer and inner tubes 34, 38 maybe pulled together with a force that generally matches that of the clamp load of the fastener 90. Further, this configuration may generally eliminate stress fractures otherwise caused by vibration and fatigue.

This configuration may also prevent the user from over extending the inner tube 38. In such embodiments, if none of the applicable apertures 62, 74 are engaged the inner tube 38 may not engage the outer tube 34. Further, if only one of the applicable apertures 62, 74 is engaged by placing the highest nut 94 in line with the lowest aperture 62 of the outer tube 38, this may result in the gooseneck coupler 30 extending beyond an operative position whereby it operatively engages with the towed vehicle and towing vehicle 32. In this situation, when the user attempts to insert the fastener 90 into the upper aperture 62 of the outer tube 38, the user will see the inner tube 34 and would not be able to insert the fastener 90—it would be a blank spot.

Figure 14:
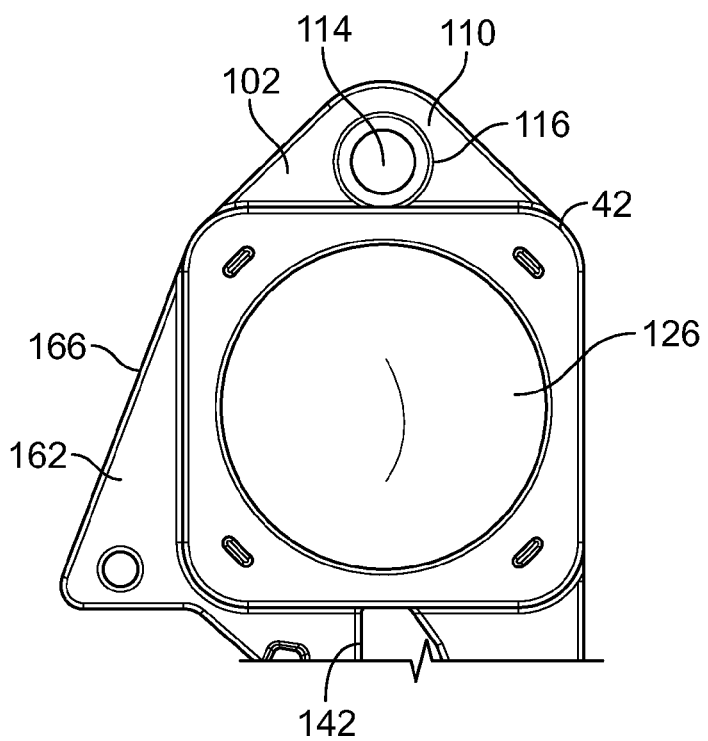
FIG. 14 is a top view of a base plate of the gooseneck coupler.
Figure 15:
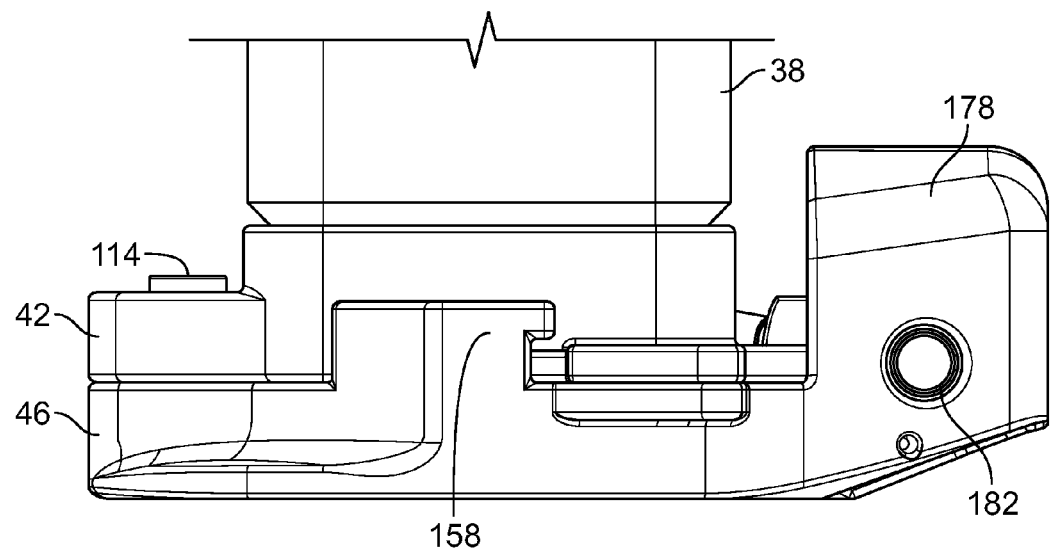
FIG. 15 is a side view of the base plate engaged with the locking plate of the gooseneck coupler.
Figure 16:
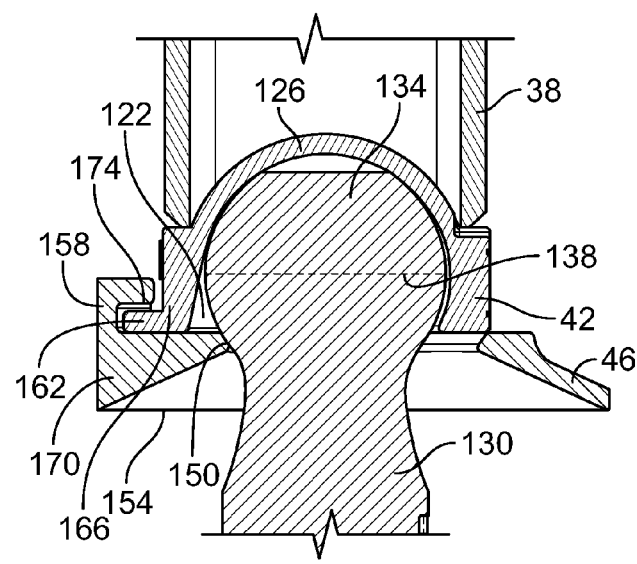
FIG. 16 is a cross-sectional view of the gooseneck coupler in an engaged position with a hitch ball.

The base plate 42 of the gooseneck coupler 30 may be of any appropriate shape, size, type or configuration, such as of a generally rectangular configuration as shown in FIG. 14, or a generally oval configuration. The base plate 42 may have an upper portion 102 and a lower portion 106. In the exemplary embodiment shown, the inner tube 38 may be attached to the upper portion 102 of the base plate 42. The upper portion 102 may have a shape that generally matches the cross-sectional shape of the inner tube 38, e.g., the upper portion 102 may be of a generally rectangular shape and the socket 126 may have a semi-spherical shape extending therefrom. This may allow the upper portion 102 of the base plate 42 to act as a fixture for the inner tube 38, e.g., it may act as a fixture for both of a generally rectangular and generally round inner tube 38. In such embodiments, upper portion 102 may attach to multiple shapes of inner tubes, such as rectangular and circular inner tubes. In these embodiments, a first portion of the hitch ball 130 may be positioned inside the inner tube 38 and a second portion of the hitch ball 130 may be positioned outside of the inner tube 38 when the hitch ball 130 is operatively engaged with the gooseneck coupler 30. Further, because the hitch ball 130 is not entirely inside the inner tube 38 an alternate tube may be smaller than otherwise allowed. In the present embodiment for example, the inner tube 38 may be a 4.5" square and/or 4" round tube.

It should be understood, however, that the upper portion 102 may be of any appropriate shape and is not limited to that shown and described herein. By way of a non-limiting example, the upper portion 102 may be generally circular, oval or the like. In these embodiments, the amount of material required to form either of the inner tube 38 and the base plate 42 may be reduced while maintaining the appropriate amount of operative strength for the gooseneck coupler 30. The socket 126 may maintain the shape shown in the drawings, i.e., the semi-spherical shape, instead of being formed as a straight line to which the inner tube will attach. To form the socket within the straight line would require additional material to be included, which is not needed with the present teachings.

The base plate 42 may further include an extension portion 110. The extension portion 110 may provide additional material to attach the base plate 42 with the locking plate 46 as further described below. A pivotal male extension member 114 may pivotally attach the locking plate 46 with the base plate 42. The male extension member 114 may be of any appropriate configuration. For example, the male extension member 114 may be a pivot pin or rivet as shown in the drawings. In an exemplary embodiment, the base plate 42 may include an aperture 116 sized and shape to receive the rivet 114 therein and the locking plate 46 may include an aperture 118 shaped and sized to receive the rivet 114 therein to pivotally attach the locking plate 46 and the base plate 42. The rivet 114 may be attached to the base plate 42, such as through welding or the like and the locking plate 46 may pivot on a head 115 of the rivet. In some embodiments however, pivotal male extension 114 may integrally formed with the base plate 42, i.e., it may be monolithically formed or attached thereto through a subsequent action such as welding or fastening.

The base plate 42 may further include an opening 122. The opening 122 may be of any appropriate shape, size, type or configuration, such as a generally circular shape shown in FIGS. 16-24. The opening 122 may be located at any appropriate position on the base plate 42, such as at an approximate central location on the base plate 42 as shown in the exemplary embodiment. The base plate 42 may further include a socket 126 that may be positioned directly over the opening 122 such that the opening 122 may provide access to the socket 126.

The socket 126 may be of any appropriate shape, size, type or configuration, such as of a generally semi-spherical shape as shown in the exemplary embodiment of FIGS. 5 and 8-10. For example, the socket 126 may be of a shape and size to receive a hitch ball 130, such as a three inch heavy duty hitch ball, which may be attached to a towing vehicle in a conventional manner. The hitch ball 130 may include a spherical portion 134 and a centerline 138. The socket 126 may be located at any appropriate position, such as adjacent the opening 122 of the base plate 42 and adjacent the first end 66 of the inner tube 38. The socket 126 may be secured to the base plate 42 by any appropriate means, such as by welding, or the like or may be monolithically formed therewith. The socket 126 may be positioned on the base plate 42 such that when the inner tube 38 is operatively engaged with the base plate 42, the socket 126 is generally positioned within the inner tube 38. This may prevent wasted material and additional costs of manufacturing such—this configuration may allow a large hitch ball size to work with a smaller tube considering wall thickness etc. By way of a non-limiting example, one could make surface 102 taller or higher so the socket 126 may go beyond the first end 66 of the inner tube 38. As a solid casting generally costs more to produce than a hollow tube the prior art versions tend to cost more.

The base plate 42 may include a slot 142. The slot 142 may be positioned in proximity to the locking mechanism 50 such that when the gooseneck coupler 30 is in the locked position, the locking mechanism 50 engages the slot 142 as more fully described below. The slot 142 may be integrally formed with the base plate 42 or may be formed therein such as by machining the slot 142 into the base plate 42 after formation of the base plate 42, by way of a non-limiting example.

The locking plate 46 may be of any appropriate shape, size, type or configuration, such as of a generally ovular or rectangular configuration. For example, the locking plate 46 may be of a similar shape and size as that of the base plate 42, i.e., it may be generally rectangular. The locking plate 46 may be located at any appropriate position on the gooseneck coupler 30, such as adjacent base plate 42. For example, the locking plate 46 may be located in pivoting engagement with the base plate 42 and in particular to the lower portion 106 of the base plate 42. More specifically, the locking plate 46 may be pivotably connected to the base plate 42 at a pivot 146.

The locking plate 46 may include a hitch ball opening 150. The hitch ball opening 150 may be of any appropriate shape, size, type or configuration, such as of a generally circular shape. For example, the hitch ball opening 150 may be of a similar shape and size as that of the opening 122 in the base plate 42. The hitch ball opening 150 may be located at any appropriate position on the locking plate 46, such as at an approximate central location on the locking plate 46, whereby the hitch ball opening 150 may generally align with the opening 122 in the base plate 42 when the base plate 42 and locking plate 46 are pivotably attached and are in the unlocked position.

This alignment of the opening 122 in the base plate 42 and the hitch ball opening 150 of the locking plate 46 may provide an entrance for the hitch ball 130 to enter into the socket 126 of the base plate 42. The hitch ball 130 of the towing vehicle may generally be located within and abut the socket 126 during engagement of the gooseneck coupler 30 and the towed vehicle. The engagement of the hitch ball 130 on the spherical portion 134 thereof may permit a larger articulation angle of the gooseneck coupler 30, which in turn may allow for more articulation between the towed vehicle and towing vehicle 32 while appropriately retaining the hitch ball 130 against the locking plate 46 as described in more detail below.

The locking plate 46 may be of a shape and size to include an entry distended surface 154, which in some embodiments may be generally symmetrical. However, the distended surface 154 may be non-symmetrical without departing from the present teachings. In particular, the distended surface 154 may be shaped so that it extends as a funnel out from the hitch ball opening 150 of the locking plate 46 to create a larger surface, which may make it easier to install the hitch ball 130 through the hitch ball opening 150, through the opening 122, and into the socket 126. For example, when the gooseneck coupler 30 is lowered onto the hitch ball 130 the distended surface 154 may create a big target such that any minor misalignment between the gooseneck coupler 30 and the hitch ball 130 may be substantially corrected. As the gooseneck coupler 30 is lowered onto the hitch ball 130, gravity helps move the gooseneck coupler 30 into substantial alignment with the hitch ball 130 by riding along the distended surface 154 until the hitch ball 130 enters the opening 150 in the locking plate 46 and the opening 122 in the base plate 42.

Figure 17:
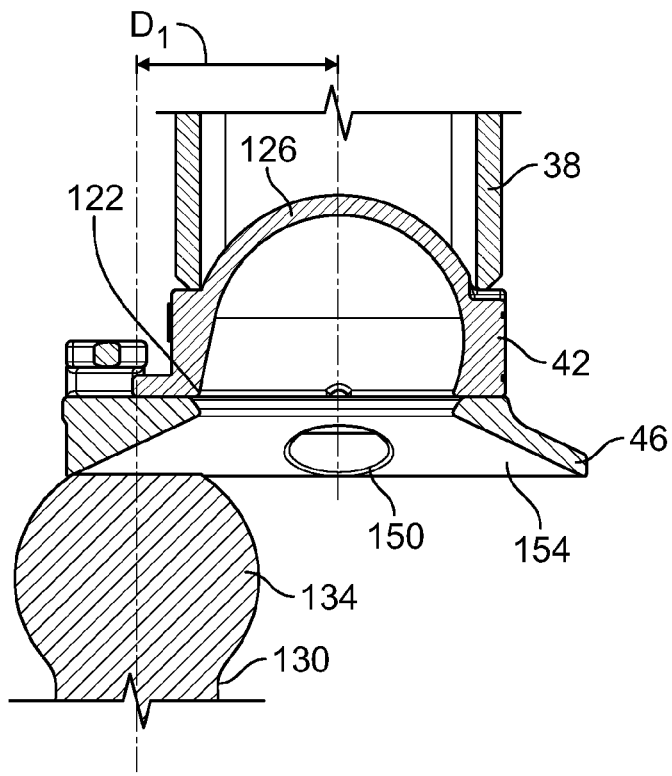
FIG. 17 is a cross-sectional view of the gooseneck coupler with the hitch ball engaged with the distended surface of the locking plate.

FIGS. 17-20 depict an exemplary embodiment of the distended surface 154 and how far off center the hitch ball 130 may be in each direction and still find center of the socket 126 during engagement of the hitch ball 130 with the gooseneck coupler 30. By way of a non-limiting example as shown in FIG. 17, the hitch ball 130 may engage the distended surface 154 at a distance $D_1$ from a center of the socket 126 in the orientation shown. At this location, the hitch ball 130 may still find the center of the socket 126 such that the hitch ball 130 may operatively engage the gooseneck coupler 30, i.e., the hitch ball 130 may ride along the distended surface 154 until the hitch ball 130 enters the opening 150 in the locking plate 46 and the opening 122 in the base plate 42 from a distance $D_1$. $D_1$ may be of any appropriate distance, including without limitation being no less than 2.5 inches.

Figure 18:
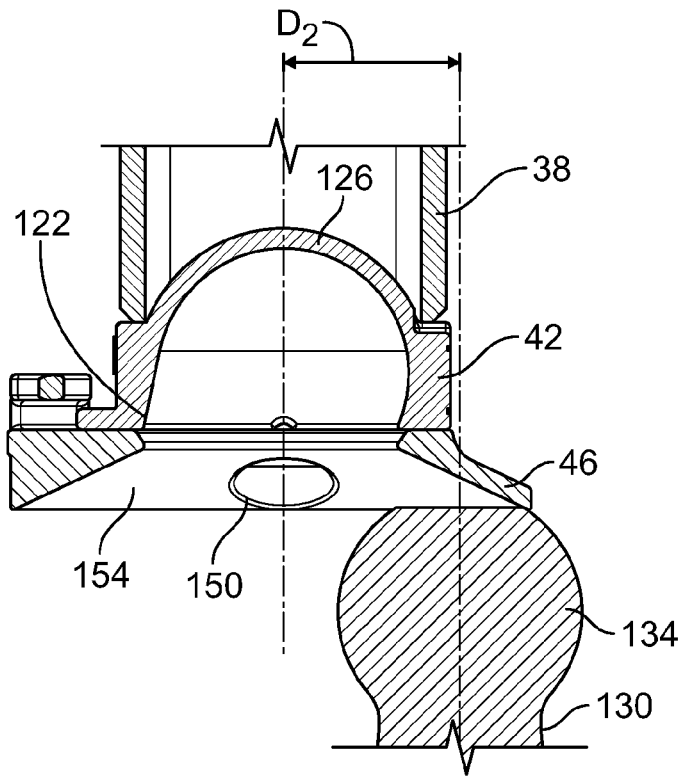
FIG. 18 is a cross-sectional view of the gooseneck coupler with the hitch ball engaged with the distended surface of the locking plate.

As shown in FIG. 18, the hitch ball 130 may engage the distended surface 154 at a distance $D_2$ from a center of the socket 126 in the orientation shown. At this location, the hitch ball 130 may still find the center of the socket 126 such that the hitch ball 130 may operatively engage the gooseneck coupler 30, i.e., the hitch ball 130 may ride along the distended surface 154 until the hitch ball 130 enters the opening 150 in the locking plate 46 and the opening 122 in the base plate 42 from a distance $D_2$. $D_2$ may be of any appropriate distance, including without limitation being no less than 2.1 inches.

Figure 19:
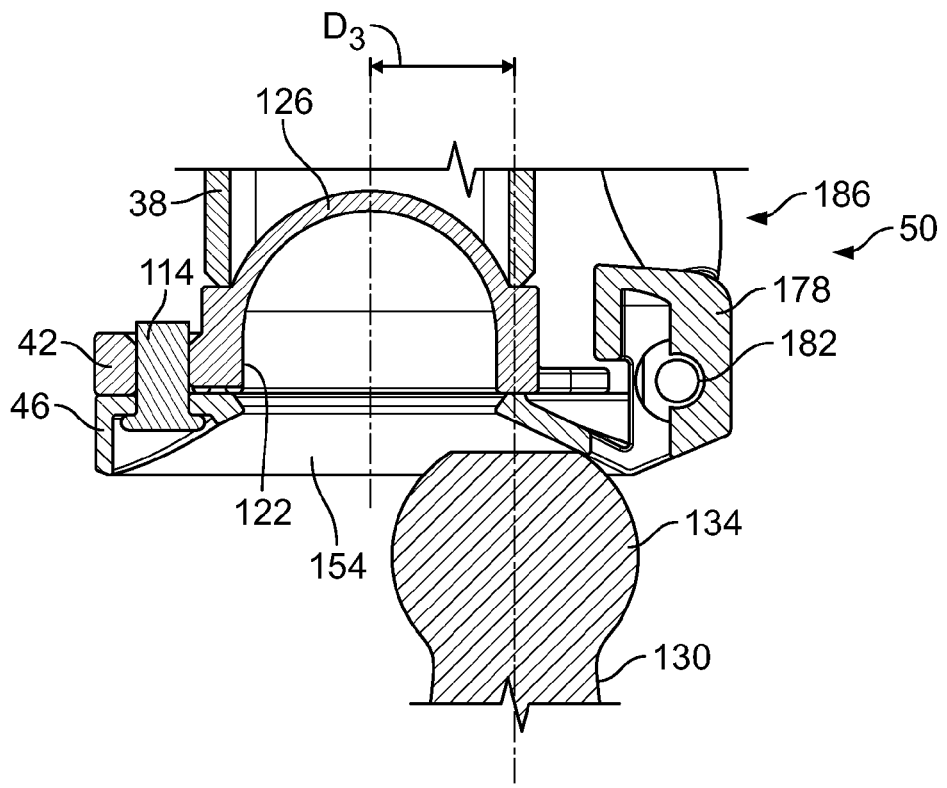
FIG. 19 is a cross-sectional view of the gooseneck coupler with the hitch ball engaged with the distended surface of the locking plate.

As shown in FIG. 19, the hitch ball 130 may engage the distended surface 154 at a distance $D_3$ from a center of the socket 126 in the orientation shown. At this location, the hitch ball 130 may still find the center of the socket 126 such that the hitch ball 130 may operatively engage the gooseneck coupler 30, i.e., the hitch ball 130 may ride along the distended surface 154 until the hitch ball 130 enters the opening 150 in the locking plate 46 and the opening 122 in the base plate 42 from a distance $D_3$. $D_3$ may be of any appropriate distance, including without limitation being no less than 1.8 inches.

Figure 20:
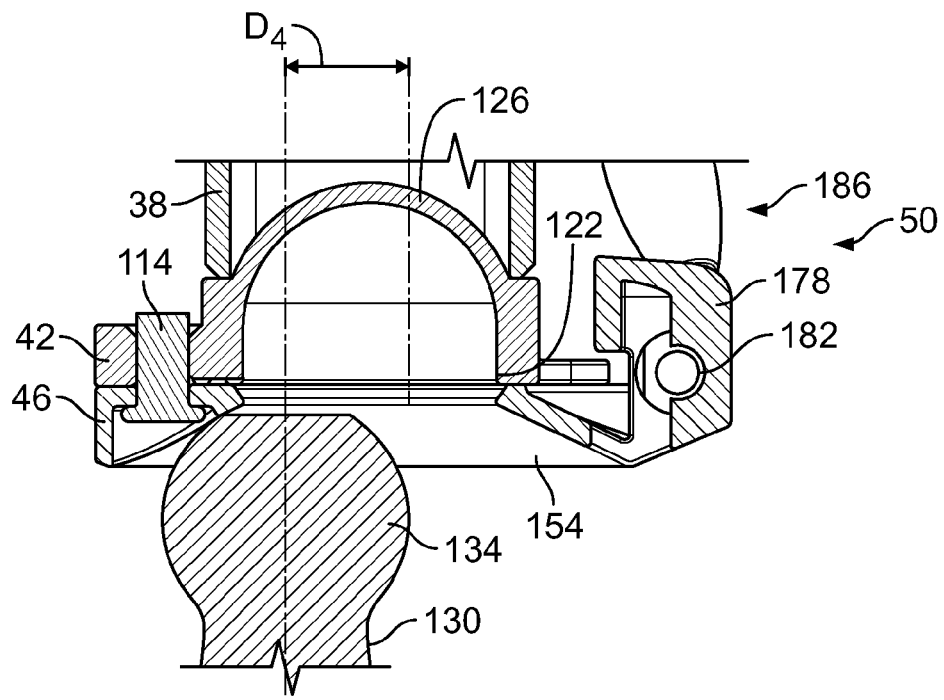
FIG. 20 is a cross-sectional view of the gooseneck coupler with the hitch ball engaged with the distended surface of the locking plate.

As shown in FIG. 20, the hitch ball 130 may engage the distended surface 154 at a distance $D_4$ from a center of the socket 126 in the orientation shown. At this location, the hitch ball 130 may still find the center of the socket 126 such that the hitch ball 130 may operatively engage the gooseneck coupler 30, i.e., the hitch ball 130 may ride along the distended surface 154 until the hitch ball 130 enters the opening 150 in the locking plate 46 and the opening 122 in the base plate 42 from a distance $D_4$. $D_4$ may be of any appropriate distance, including without limitation being no less than 1 inch. It should be understood, however, that the present teachings are not limited to the dimensions for $D_1$, $D_2$, $D_3$ and $D_4$ set forth above. Any appropriate dimension may be achieved without departing from the present teachings.

As identified above, the engagement of the hitch ball 130 on the spherical portion 134 may permit a larger articulation angle of the gooseneck coupler 30, which in turn may allow for more articulation between the towed vehicle and towing vehicle 32 while appropriately retaining the hitch ball 130 against the locking plate 46. Further, the configuration of the gooseneck coupler 30 may permit larger angles of articulation than other prior art versions. FIGS. 21-24 depict exemplary pitch and roll angle achieved by the gooseneck coupler 30 until interference is introduced between the hitch ball 130 and gooseneck coupler 30 or the load bed 33 of the towing vehicle 32 and the gooseneck coupler 30. In these embodiments, the hitch ball 130 may be engaged with the locking plate 46 on two sides of the hitch ball 130. The gooseneck coupler 30 may include a clinch as described in U.S. patent application Ser. Nos. 13/299,453 and 13/299,424, both of which are incorporated herein by reference, which may engage the hitch ball 130 when operatively positioned within the gooseneck coupler 30. This engagement may permit the hitch ball 130 to be positioned a bit more outside of the socket 126 than other prior art systems, which may provide the applicable articulation angles.

Figure 21:
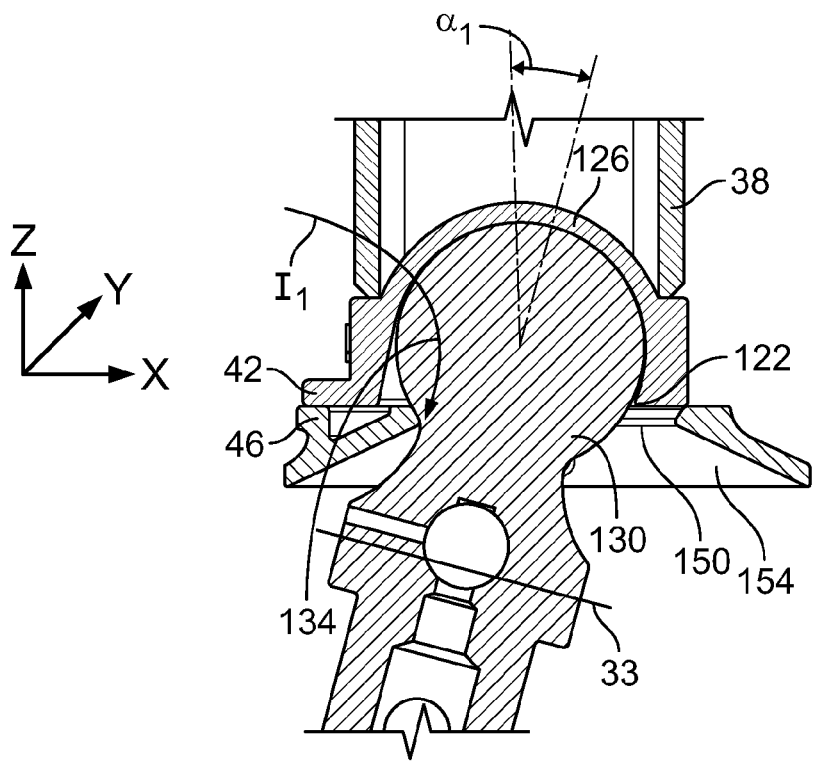
FIG. 21 is a cross-sectional view of the gooseneck coupler with the hitch ball engaged identifying the pitch from a first direction with respect to the gooseneck coupler.

By way of a non-limiting example, and as shown in FIG. 21, the hitch ball 130 may articulate at an angle $\alpha_1$ toward a first direction relative the towing vehicle 32 during operation until the hitch ball 130 engages the locking plate 46 as shown at $I_1$. The first direction may be along the X-axis as shown—although the present teachings are not limited to such direction. $I_1$ may represent a point of interference during operation of the gooseneck coupler 30. In this embodiment, the angle $\alpha_1$ may be approximately 15 degrees and is shown as interfering with a lower portion of the hitch ball 130.

Figure 22:
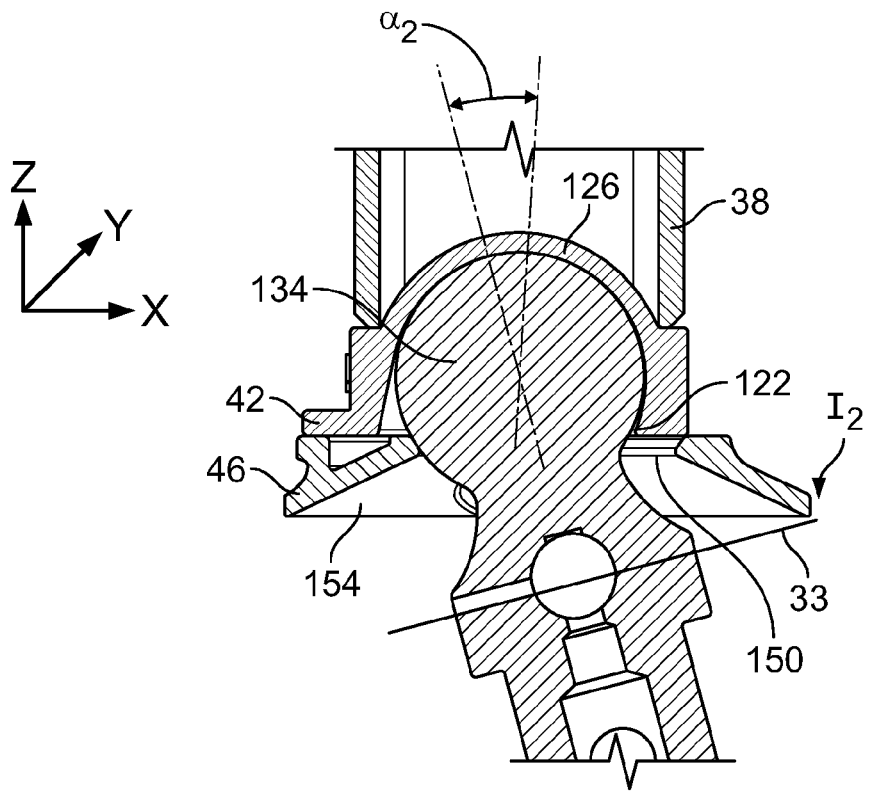
FIG. 22 is a cross-sectional view of the gooseneck coupler with the hitch ball engaged identifying the pitch from a second direction with respect to gooseneck coupler.

As shown in FIG. 22, the hitch ball 130 may articulate at an angle $\alpha_2$ toward a second direction relative the towing vehicle 32 during operation until the gooseneck coupler 30 or more specifically, the locking plate 46 engages the load bed 33 of the towing vehicle 32 as shown at $I_2$. The second direction may be along the X-axis as shown—although the present teachings are not limited to such direction. $I_2$ may represent a point of interference during operation of the gooseneck coupler 30. In this embodiment, the angle $\alpha_2$ may be approximately 21 degrees and is shown as interfering with the load bed 33.

Figure 23:
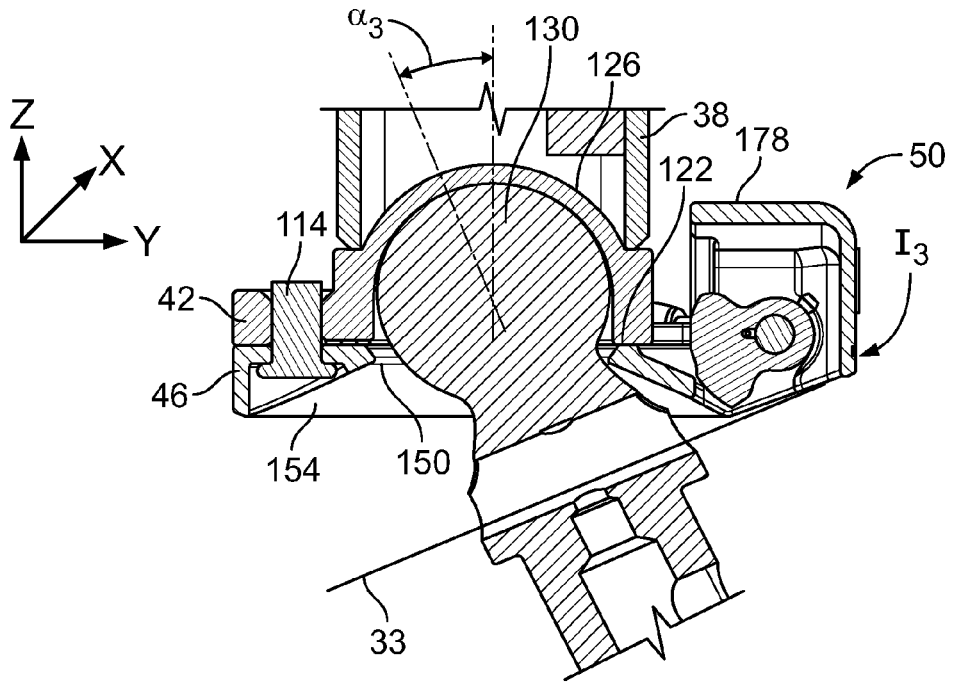
FIG. 23 is a cross-sectional view of the gooseneck coupler with the hitch ball engaged identifying the roll from a third direction with respect to the gooseneck coupler.

As shown in FIG. 23, the hitch ball 130 may articulate at an angle $\alpha_3$ toward a third direction relative the towing vehicle 32, e.g., along one side as shown, during operation until the gooseneck coupler or more specifically the portion of the locking plate 46 immediately below body portion 178 engages the load bed 33 of the towing vehicle 32 as shown at $I_3$. The third direction may be along the Y-axis as shown—although the present teachings are not limited to such direction. $I_3$ may represent a point of interference during operation of the gooseneck coupler 30. In this embodiment, the angle $\alpha_3$ may be approximately 24 degrees and is shown as interfering with the load bed 33.

Figure 24:
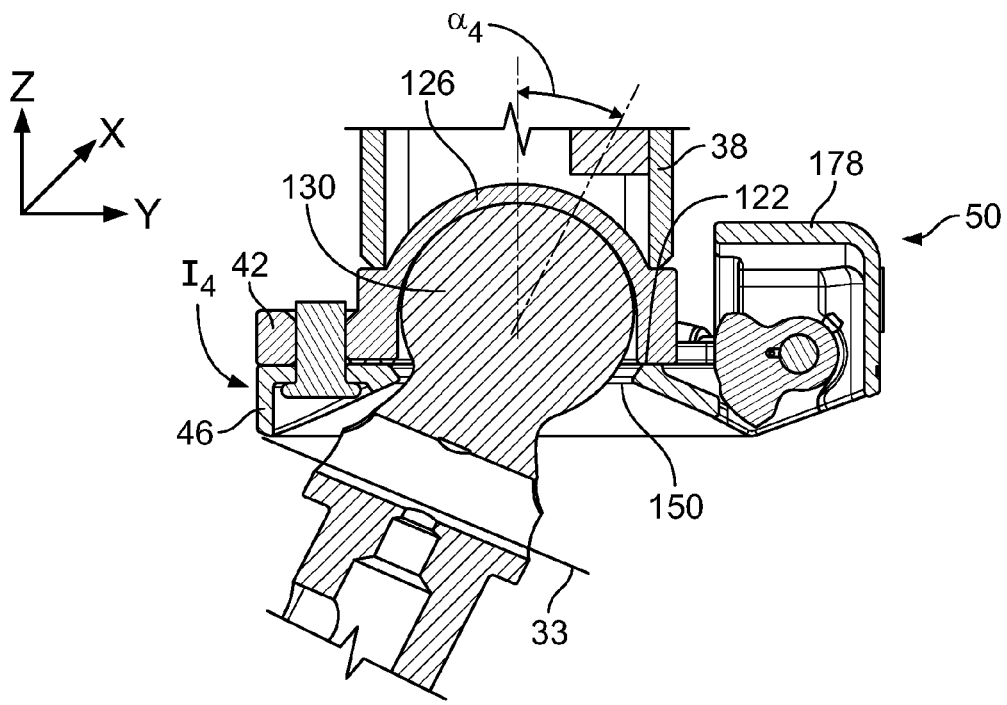
FIG. 24 is a cross-sectional view of the gooseneck coupler with the hitch ball engaged identifying the roll from a fourth direction with respect to the gooseneck coupler.

As shown in FIG. 24, the hitch ball 130 may articulate at an angle $\alpha_4$ toward a fourth direction relative the towing vehicle 32, e.g., a second side, during operation until the gooseneck coupler or more specifically the portion of the locking plate 46 immediately below extension portion 110 engages the load bed 33 of the towing vehicle 32 as shown at $I_4$. The fourth direction may be along the Y-axis as shown—although the present teachings are not limited to such direction. $I_4$ may represent a point of interference during operation of the gooseneck coupler 30. In this embodiment, the angle $\alpha_4$ may be approximately 24 degrees and is shown as interfering with the load bed 33. It should be understood, however, that the present teachings are not limited to the dimensions for $\alpha_1, \alpha_2, \alpha_3$ or $\alpha_3$ set forth above. Any appropriate dimension may be achieved without departing from the present teachings. Further still, the present teachings are not limited to the specific interference points $I_1, I_2, I_3$ and $I_4$ identified in the drawings. The shape and size of the gooseneck coupler 30 may provide the relevant clearances to provide the articulation angles set forth above. For example, the shape of the base plate 42 (such as below the locking mechanism) being slanted generally upward may provide the needed clearance to as shown in FIG. 23. Further still, the size of the distended surface 154 may contribute to the amount of articulation of the gooseneck coupler 30. If the distended surface 154 is larger than shown, the amount of articulation of the gooseneck coupler 30 may be reduced. If the distended surface 154 is smaller than shown, the amount of articulation may increase, but the distances at which the hitch ball 130 will engage and enter into the hitch ball opening 150 and into the socket 126 may be reduced. The present teachings provide a user friendly combination of these factors to provide an effective and efficient gooseneck coupler 30.

The locking plate 46 may include a force transfer member 158 of any appropriate configuration that may operatively engage the base plate 42 in any appropriate manner. The force transfer member 158 may distribute high stress loads to improve strength and performance to improve vertical tension requirements without adding excessive amounts of material. As shown in an exemplary embodiment in FIGS. 1-5, the force transfer member 158 may include a first engaging member 162 that extends from a side portion 166 of the base plate 42. The first engaging member 162 may comprise a male member as shown. The force transfer member 158 may further include a second engaging member 174 positioned on a side portion 170 of the locking plate 46. The second engaging member 174 may be of a configuration such that the first engaging member 162 is selectively engageable with the second engaging member 174. By way of a non-limiting example, the male member 162 may be selectively insertable into and engageable with the female member 174, i.e., the male member 162 may slide into engagement with the female member 174 during pivoting of the locking plate 46 with respect to the base plate 42. The engagement of the force transfer member 158, or more specifically, engagement of the first and second engaging members 162, 174 may prevent deflection between the base plate 42 and locking plate 46 during operation.

By way of a non-limiting example, the minimum vertical tension required for gooseneck couplers is 50% of the rated capacity. As such to pass a 40,000 pound rating the gooseneck coupler must meet a vertical tension of 20,000 pounds. The present configuration, i.e., the force transfer member 158 met the requirement by having a predetermined deflection at 20,000 pounds between the base plate 42 and locking plate 46. It should further be understood that while the first and second engaging members 162, 174 are shown as male and female members respectively, the present teachings are not limited to this configuration. In some embodiments, the first engaging member 162 may be a female member and the second engaging member 174 may be a male member. Any appropriate configuration whereby the first engaging member 162 selectively and operatively engages the second engaging member 174 will suffice.

The locking mechanism 50 may include a body portion 178 that is attached to the locking plate 46. The body portion 178 may be welded to the locking plate 46 or alternatively, may be integrally formed with the locking plate 46 so that they are formed of one integral piece. The body portion 178 may include at least one aperture 182. Although, in the exemplary embodiment shown, by way of a non-limiting example, two apertures 182 are shown located on opposite sides of the body portion 178.

The locking mechanism 50 may further include a handle 186. The handle 186 may comprise a substantially straight tubular portion 190 and a curved portion 194. The straight portion 190 and the curved portion 194 may be integrally formed together, may be welded together, or otherwise attached using fasteners, or the like. The straight portion 190 may extend through the body portion 178, and in particular, through the apertures 182 such that at least a portion of the straight portion 190 is retained within the body portion 178.

The locking mechanism 50 may be of any appropriate configuration. By way of a non-limiting example, the locking mechanism 50 may be substantially similar to the locking mechanism disclosed in U.S. patent application Ser. Nos. 13/299,453 and 13/299,424, both of which are incorporated herein by reference.

In operation, the gooseneck coupler 30 is capable of engaging the hitch ball 130 attached to the towing vehicle such that the towing vehicle may tow the towed vehicle. More specifically, the gooseneck coupler 30 may be positioned over the hitch ball 130 on the towing vehicle. The locking mechanism 50 is put in the unlocked position and the aperture 150 of the locking plate 46 is generally lined up with the aperture 122 of the base plate 42. The hitch ball 130 is then positioned through the hitch ball opening 150 in the locking plate 46 and through the opening 122 in the base plate 42 until the hitch ball 130 rests within the socket 126. Then the locking plate 46 may be pivoted against the hitch ball 130 to wedgingly engage the locking plate 46 with the hitch ball 130. The handle 186 may be used to help pivot the locking plate 46.

The locking mechanism 50 may be engaged to the locking position to lock the gooseneck coupler 30 to the hitch ball 130. The locking mechanism 50 may be rotated from the unlocked position to the locked position. By way of a non-limiting example, to lock the locking mechanism 50 the handle 186, and in particular, gripping portion 198, may be rotated counter-clockwise by a user. As the handle 186 is rotated in a first direction, e.g., clockwise, a portion of the locking mechanism 50 begins to engage the slot 142 of the base plate 42, which wedgingly engages the locking plate 46 to the hitch ball 130. The more the handle 186 is rotated in the first direction the more the portion of the locking mechanism engages the slot 142 of the base plate 42. The more the locking plate 46 pivots relative to the base plate 42 the more the locking plate 46 engages the hitch ball 130 further securing the gooseneck coupler 30 to the hitch ball 130. The relative rotation between base plate 42 and locking plate 46 may cause openings 122, 150 to become misaligned and secures the hitch ball 130 within socket 126.

The structure of the exemplary embodiment of the locking mechanism 50 permits an operator to use the handle 186 to lock the gooseneck coupler 30. In operation, the operator may only need to use the handle 186 to laterally move the locking plate 46 to pivot relative to the base plate 42 to lock the gooseneck coupler 30 in place.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A gooseneck coupler comprising:
   a first member having at least one aperture;
   a second member having at least one aperture, the second member telescopingly engaged with the first member wherein the at least one aperture of the first member is generally aligned with the at least one aperture of the second member;
   a base member attached with the second member, the base member having a socket shaped to accept a hitch ball;
   a locking member pivotally attached with the base member; and
   a fastening device securing the first and second members, the fastening device comprising:
      at least one nut attached with at least one elongated member, wherein the at least one nut and the at least one elongated member are positioned within the second member; and
      a fastener inserted into the at least one apertures of the first and second members and selectively engaged with the at least one nut.

2. The gooseneck coupler of claim 1, wherein the at least one nut includes a plurality of nuts attached with the at least one elongated member, whereby the plurality of nuts are spaced apart from one another.

3. The gooseneck coupler of claim 1, wherein the at least one elongated member includes a pair of elongated members.

4. The gooseneck coupler of claim 3, wherein the at least one aperture of the first member includes two pairs of apertures positioned on adjacent sides of the first member.

5. The gooseneck coupler of claim 4, wherein the at least one aperture of the second member includes three pair of apertures positioned on adjacent sides of the second member.

6. The gooseneck coupler of claim 5, wherein each of the pair of elongated members has the plurality of nuts attached thereto.

7. The gooseneck coupler of claim 1, wherein the at least one nut includes a plurality of nuts.

8. The gooseneck coupler of claim 1, wherein the at least one nut is welded to the at least one elongated member.

9. The gooseneck coupler of claim 1, wherein the at least one elongated member includes an elongated bar member.

10. The gooseneck coupler of claim 1, wherein the fastener includes a head, the head positioned outside of the first member.

11. The gooseneck coupler of claim 1, wherein the first member is an outer tube and the second member is an inner tube.

12. A gooseneck coupler comprising:
    a first tube;
    a second tube telescopingly engaged with the first tube;
    a base member attached with the second tube, the base member having a socket shaped to accept a hitch ball and a first engaging member;
    a locking member pivotally attached with the base member, the locking member having a second engaging member; and
    wherein general horizontal engagement of the first and second engaging members generally maintains the base member and locking member in an operative position with respect to one another under a load.

13. The gooseneck coupler of claim 12, wherein the first engaging member is a male member and the second engaging member is a female member.

14. The gooseneck coupler of claim 13, wherein the male member is slidably insertable into the female member.

15. The gooseneck coupler of claim 13, wherein the female member circumscribes a substantial portion of the male member when operatively engaged with each other.

16. The gooseneck coupler of claim 15, wherein the substantial portion is a majority portion.

17. The gooseneck coupler of claim 13, wherein the female member generally circumscribes the male member when operatively engaged with each other.

18. The gooseneck coupler of claim 12, further comprising a locking mechanism that includes a body and a handle portion wherein the locking mechanism may engage the base plate in a locked position to lock the gooseneck coupler to the hitch ball.

19. The gooseneck coupler of claim 12, wherein the relative rotation between the base plate and the locking member cause openings to become misaligned and secures the hitch ball within the socket.

20. A gooseneck coupler capable of operatively engaging a hitch ball having a generally spherical portion, the hitch ball positioned in a load bed of a towing vehicle, the gooseneck coupler comprising:
    an outer tube;
    an inner tube telescopingly engaged with the outer tube;
    a base member attached with the inner tube, the base member having a socket shaped to accept the hitch ball and a first engaging member;
    a locking member pivotally attached with the base member, the locking member includes a second engaging member; and
    wherein the first engagement member is engageable with the second engaging member during pivoting of the locking member with respect to the base member, wherein the locking member engages the spherical portion of the hitch ball, whereby the hitch ball articulates with the base member at an angle between 15 and 24 degrees.

21. The gooseneck coupler of claim 20, wherein the outer tube and inner tube are generally rectangular in cross-sectional shape.

22. The gooseneck coupler of claim 20, further comprising a fastening device securing the outer and inner tubes, the fastening device comprising:
    at least one nut attached with at least one elongated member, wherein the at least one nut and the at least one elongated member are positioned within the inner tube; and
    a fastener inserted through the inner and outer tubes and selectively engaged with the at least one nut.

23. A gooseneck coupler comprising:
    an outer tube having at least one aperture;
    an inner tube having at least one aperture, the inner tube telescopingly engaged with the outer tube wherein the at least one aperture of the outer tube is generally aligned with the at least one aperture of the inner tube;
    a base member attached with the inner tube, the base member having a socket shaped to accept a hitch ball;
    a locking member pivotally attached with the base member; and
    a fastening device securing the outer and inner tubes, the fastening device comprising:

at least one nut attached with at least one elongated member, wherein the at least one nut and the at least one elongated member are positioned within the inner tube; and a fastener inserted into the at least one apertures of the inner and outer tubes and selectively engaged with the at least one nut.

\* \* \* \* \*